US009374824B2

(12) United States Patent
Gerber et al.

(10) Patent No.: US 9,374,824 B2
(45) Date of Patent: *Jun. 21, 2016

(54) TAIL OPTIMIZATION PROTOCOL FOR CELLULAR RADIO RESOURCE ALLOCATION

(71) Applicant: AT&T Intellectual Property I, L.P., Atlanta, GA (US)

(72) Inventors: Alexandre Gerber, Madison, NJ (US); Zhuoqing Mao, Ann Arbor, MI (US); Feng Qian, Basking Ridge, NJ (US); Subhabrata Sen, New Providence, NJ (US); Oliver Spatscheck, Randolph, NJ (US); Zhaoguang Wang, Cupertino, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/257,600

(22) Filed: Apr. 21, 2014

(65) Prior Publication Data

US 2014/0228040 A1   Aug. 14, 2014

Related U.S. Application Data

(63) Continuation of application No. 12/872,604, filed on Aug. 31, 2010, now Pat. No. 8,744,367.

(51) Int. Cl.
*H04W 84/08* (2009.01)
*H04W 72/04* (2009.01)
(Continued)

(52) U.S. Cl.
CPC .......... *H04W 72/048* (2013.01); *H04W 76/068* (2013.01); *H04L 43/16* (2013.01); *Y02B 60/50* (2013.01)

(58) Field of Classification Search
CPC .... H04W 72/048; H04W 72/04; H04W 24/00
USPC ........................ 455/450, 67.11; 370/465, 467
See application file for complete search history.

(56) References Cited

U.S. PATENT DOCUMENTS 5,432,775 A * 7/1995 Crayford ........... H04L 12/40136
370/248
5,504,803 A * 4/1996 Yamada ................ H04W 48/18
455/426.1

(Continued)

OTHER PUBLICATIONS

Notice of Allowance dated Oct. 22, 2014 for U.S. Appl. No. 13/956,028, 34 pages.

(Continued)

*Primary Examiner* — Hai V Nguyen
(74) *Attorney, Agent, or Firm* — Amin, Turocy & Watson, LLP

(57) ABSTRACT

Power and resource efficiency of a mobile network device are increased. In one aspect, a Tail Optimization Protocol (TOP) enables cooperation between a mobile device and an associated radio access network to eliminate idle periods (e.g., tails) when possible. Various systems and methods described herein can leverage the ability of applications and/or their associated connections to accurately predict a long tail time, from which a mobile device can notify an associated cellular network on such an imminent tail in order to allow the cellular network to immediately release tail resources. Various other aspects provided herein realize TOP via fast dormancy and/or other similar notification mechanisms, which enable a handset or other device to notify a cellular network for immediate resource release.

20 Claims, 14 Drawing Sheets

(51) Int. Cl.
*H04W 76/06* (2009.01)
*H04L 12/26* (2006.01)

(56) References Cited

U.S. PATENT DOCUMENTS

| | | | | |
|---|---|---|---|---|
| 5,610,903 | A * | 3/1997 | Crayford | H04L 12/40136 370/213 |
| 5,678,036 | A * | 10/1997 | Lin | G06T 1/20 345/503 |
| 5,764,641 | A * | 6/1998 | Lin | H04Q 11/0478 370/412 |
| 6,011,960 | A * | 1/2000 | Yamada | H04W 48/18 370/329 |
| 6,138,010 | A * | 10/2000 | Rabe | H04B 1/005 455/426.1 |
| 6,201,966 | B1 * | 3/2001 | Rinne | H04W 48/14 455/434 |
| 6,222,854 | B1 * | 4/2001 | Dove | H04L 41/06 370/241 |
| 6,438,573 | B1 * | 8/2002 | Nilsen | G06F 8/10 718/100 |
| 6,487,183 | B1 * | 11/2002 | Lo | H04B 7/18582 370/326 |
| 6,507,731 | B1 * | 1/2003 | Hasegawa | H03F 1/0205 330/129 |
| 6,519,266 | B1 * | 2/2003 | Manning | H04L 29/06 370/328 |
| 6,553,031 | B1 * | 4/2003 | Nakamura | H04L 45/54 370/359 |
| 6,584,331 | B2 * | 6/2003 | Ranta | H04W 52/24 342/357.74 |
| 6,937,609 | B1 * | 8/2005 | Hong | H04W 74/0841 370/337 |
| 6,978,143 | B1 * | 12/2005 | Vialen | H04W 28/18 370/329 |
| 6,999,432 | B2 * | 2/2006 | Zhang | H04L 1/0001 370/328 |
| 7,058,826 | B2 | 6/2006 | Fung | |
| 7,089,380 | B1 * | 8/2006 | Schober | G06F 5/12 370/389 |
| 7,181,667 | B2 * | 2/2007 | Argyropoulos | H04L 49/90 370/232 |
| 7,206,286 | B2 * | 4/2007 | Abraham | H04W 36/26 370/235 |
| 7,209,462 | B2 * | 4/2007 | Sayeedi | H04W 76/022 370/335 |
| 7,215,666 | B1 | 5/2007 | Beshai et al. | |
| 7,248,887 | B2 * | 7/2007 | Zhang | H04W 74/0841 370/332 |
| 7,266,365 | B2 * | 9/2007 | Ferguson | G06Q 10/107 455/412.1 |
| 7,295,119 | B2 | 11/2007 | Rappaport et al. | |
| 7,317,732 | B2 * | 1/2008 | Mills | H04L 12/12 370/445 |
| 7,349,371 | B2 * | 3/2008 | Schein | H04W 74/006 370/329 |
| 7,349,433 | B2 * | 3/2008 | Ho | H04L 12/5695 370/252 |
| 7,398,049 | B2 * | 7/2008 | Blodgett | C08L 63/00 343/702 |
| 7,454,220 | B2 * | 11/2008 | Zhang | H04W 74/0841 370/332 |
| 7,471,961 | B2 * | 12/2008 | Fabien | H04W 72/005 455/445 |
| 7,546,367 | B2 * | 6/2009 | Mahdavi | H04L 47/10 370/230 |
| 7,620,054 | B2 * | 11/2009 | Katayama | H04L 12/5693 370/395.42 |
| 7,630,346 | B2 * | 12/2009 | Schein | H04W 74/0866 370/329 |
| 7,634,542 | B1 * | 12/2009 | Krause | G06F 9/5083 709/206 |
| 7,733,832 | B2 * | 6/2010 | Kwak | H04W 72/1284 370/230 |
| 7,801,525 | B2 * | 9/2010 | Benco | H04W 68/00 455/434 |
| 7,818,786 | B2 * | 10/2010 | Yoon | H04L 63/0254 726/23 |
| 7,853,266 | B2 * | 12/2010 | Moinet | H04L 12/5695 370/338 |
| 7,855,951 | B2 * | 12/2010 | Kim | H04W 72/1284 370/216 |
| 7,860,063 | B2 * | 12/2010 | Low | H04W 48/16 370/331 |
| 7,860,065 | B2 * | 12/2010 | Oishi | H04W 28/06 370/312 |
| 7,860,522 | B2 * | 12/2010 | Zhang | H04W 74/0841 370/322 |
| 7,864,794 | B2 * | 1/2011 | Diab | H04L 12/40136 370/442 |
| 7,889,704 | B2 * | 2/2011 | Hong | H04W 74/0841 370/337 |
| 7,912,455 | B2 * | 3/2011 | Adams | G06F 9/542 455/403 |
| 7,929,962 | B2 * | 4/2011 | Bachl | H04L 27/261 370/230.1 |
| 7,934,658 | B1 * | 5/2011 | Bhatti | G06Q 20/12 235/462.45 |
| 8,046,551 | B1 * | 10/2011 | Sahin | G06F 11/2074 711/162 |
| 8,054,791 | B2 * | 11/2011 | Vujcic | H04W 56/0045 370/329 |
| 8,060,606 | B2 * | 11/2011 | Friedman | G06F 17/3087 370/229 |
| 8,064,940 | B2 * | 11/2011 | Zhang | H04W 74/0841 370/322 |
| 8,073,908 | B2 | 12/2011 | Heins et al. | |
| 8,089,925 | B1 * | 1/2012 | Uhlik | H04W 48/12 370/310 |
| 8,103,276 | B2 * | 1/2012 | Ryu | H04W 76/046 370/311 |
| 8,155,022 | B1 * | 4/2012 | Ainsworth | H04L 25/0262 370/235 |
| 8,180,550 | B2 * | 5/2012 | Oshima | B60K 28/16 701/90 |
| 8,199,770 | B2 * | 6/2012 | Diab | H04L 12/40136 370/465 |
| 8,244,443 | B2 * | 8/2012 | Oshima | B60K 28/16 180/197 |
| 8,249,012 | B2 * | 8/2012 | Ranta-Aho | H04W 76/046 370/310 |
| 8,281,060 | B2 * | 10/2012 | Supalov | G06F 9/544 709/213 |
| 8,284,736 | B2 * | 10/2012 | Liu | H04W 52/287 370/334 |
| 8,428,025 | B2 * | 4/2013 | Hannu | H04W 76/046 370/329 |
| 8,527,627 | B2 * | 9/2013 | Gerber | H04L 43/0876 370/229 |
| 8,537,674 | B2 * | 9/2013 | Brisebois | H04W 4/001 370/231 |
| 8,649,308 | B2 * | 2/2014 | Ke | H04W 52/12 370/241 |
| 8,682,372 | B2 * | 3/2014 | Islam | H04W 52/0251 455/127.5 |
| 8,744,367 | B2 * | 6/2014 | Gerber | H04W 76/068 370/465 |
| 8,849,318 | B2 * | 9/2014 | Olofsson | H04W 36/0083 455/436 |
| 8,898,609 | B1 * | 11/2014 | Gouterman | G06F 17/5077 716/114 |
| 8,904,008 | B2 * | 12/2014 | Calder | G06F 9/5033 709/223 |
| 8,972,572 | B2 * | 3/2015 | Gerber | H04L 43/0876 370/229 |
| 9,003,017 | B2 * | 4/2015 | Gerber | G06F 11/302 709/224 |
| 9,220,066 | B2 * | 12/2015 | Gerber | H04L 67/26 |
| 9,264,872 | B2 | 2/2016 | Sen et al. | |
| 2001/0054115 | A1 * | 12/2001 | Ferguson | G06Q 10/107 709/248 |
| 2002/0021711 | A1 * | 2/2002 | Gummalla | H04L 12/2801 370/464 |

(56) References Cited

U.S. PATENT DOCUMENTS

| | | | |
|---|---|---|---|
| 2003/0103475 A1* | 6/2003 | Heppe | H04B 7/2681 370/321 |
| 2003/0169755 A1 | 9/2003 | Ternovsky | |
| 2003/0214962 A1* | 11/2003 | Allaye-Chan | H04J 3/085 370/406 |
| 2004/0252995 A1 | 12/2004 | Ovadia et al. | |
| 2005/0047533 A1* | 3/2005 | Ruelke | H03G 3/001 375/345 |
| 2005/0054358 A1* | 3/2005 | Zhang | H04W 74/0841 455/509 |
| 2005/0096089 A1* | 5/2005 | Ishii | H04W 28/26 455/561 |
| 2005/0141541 A1* | 6/2005 | Cuny | H04W 76/02 370/437 |
| 2005/0148356 A1* | 7/2005 | Ferguson | G06Q 10/107 455/502 |
| 2005/0169173 A1* | 8/2005 | Mahdavi | H04L 47/10 370/230 |
| 2005/0238042 A1* | 10/2005 | Hong | H04W 74/0841 370/442 |
| 2006/0056383 A1 | 3/2006 | Black et al. | |
| 2006/0187480 A1* | 8/2006 | Tsuchiya | G06F 1/3287 358/1.13 |
| 2006/0217118 A1* | 9/2006 | Benco | H04W 68/00 455/435.1 |
| 2006/0234623 A1 | 10/2006 | Wallis et al. | |
| 2006/0242228 A1* | 10/2006 | Eggers | H04L 29/06 709/203 |
| 2006/0270422 A1* | 11/2006 | Benco | H04W 68/04 455/458 |
| 2007/0082690 A1* | 4/2007 | Fabien | H04W 72/005 455/518 |
| 2007/0110105 A1 | 5/2007 | Usuki et al. | |
| 2007/0118316 A1 | 5/2007 | Panis | |
| 2007/0189205 A1* | 8/2007 | Terry | H04L 1/1812 370/328 |
| 2007/0211624 A1* | 9/2007 | Schmidt | H04L 12/5692 370/225 |
| 2007/0254598 A1* | 11/2007 | Bachl | H04L 27/261 455/73 |
| 2007/0288526 A1* | 12/2007 | Mankad | G06F 11/1662 |
| 2007/0294319 A1* | 12/2007 | Mankad | G06F 11/1662 |
| 2007/0298725 A1* | 12/2007 | Ryu | H04W 76/046 455/68 |
| 2008/0260087 A1 | 10/2008 | Liang et al. | |
| 2008/0304510 A1* | 12/2008 | Qu | H04W 76/064 370/463 |
| 2009/0046631 A1* | 2/2009 | Meylan | H04W 80/02 370/328 |
| 2009/0077256 A1 | 3/2009 | Madan | |
| 2009/0129339 A1* | 5/2009 | Young | H04W 72/02 370/331 |
| 2009/0137261 A1* | 5/2009 | Zhang | H04W 74/0841 455/509 |
| 2009/0185526 A1 | 7/2009 | Barber et al. | |
| 2009/0239545 A1* | 9/2009 | Lee | H04W 74/002 455/450 |
| 2009/0257378 A1* | 10/2009 | Cuny | H04W 76/02 370/328 |
| 2009/0259756 A1 | 10/2009 | Karlsson et al. | |
| 2009/0326769 A1* | 12/2009 | Oshima | B60K 28/16 701/51 |
| 2009/0326777 A1* | 12/2009 | Oshima | B60T 8/1706 701/83 |
| 2009/0326779 A1* | 12/2009 | Oshima | B60K 28/16 701/86 |
| 2010/0017077 A1* | 1/2010 | Oshima | B60K 28/16 701/51 |
| 2010/0046543 A1* | 2/2010 | Parnaby | H04L 12/12 370/465 |
| 2010/0118752 A1* | 5/2010 | Suzuki | H04W 76/048 370/311 |
| 2010/0136992 A1 | 6/2010 | Harada et al. | |
| 2010/0144363 A1* | 6/2010 | De Rosa | H04W 52/0206 455/452.1 |
| 2010/0153804 A1* | 6/2010 | Cai | H04L 47/283 714/748 |
| 2010/0161387 A1* | 6/2010 | Harrang | H04L 1/0002 709/238 |
| 2010/0188969 A1* | 7/2010 | Kim | H04W 72/1284 370/216 |
| 2011/0029664 A1* | 2/2011 | Harrang | H04L 1/0002 709/224 |
| 2011/0060927 A1* | 3/2011 | Fillingim | G11C 5/141 713/320 |
| 2011/0065470 A1* | 3/2011 | Zhang | H04W 74/0833 455/509 |
| 2011/0179153 A1* | 7/2011 | Masputra | G06F 1/3203 709/223 |
| 2011/0269463 A1* | 11/2011 | Wang | H04W 76/046 455/436 |
| 2011/0280220 A1* | 11/2011 | Jia | H04W 56/00 370/335 |
| 2011/0319064 A1* | 12/2011 | Lenart | H04W 52/0225 455/418 |
| 2012/0008496 A1* | 1/2012 | Saavedra | H04L 41/5019 370/231 |
| 2012/0047505 A1* | 2/2012 | Branson | G06F 17/30563 718/100 |
| 2012/0052814 A1 | 3/2012 | Gerber et al. | |
| 2012/0140633 A1 | 6/2012 | Stanwood et al. | |
| 2012/0151041 A1* | 6/2012 | Gerber | H04L 43/0876 709/224 |
| 2012/0191309 A1* | 7/2012 | Oshima | B60K 28/16 701/51 |
| 2012/0218983 A1* | 8/2012 | Noh | H04B 7/0452 370/338 |
| 2012/0230240 A1 | 9/2012 | Nebat et al. | |
| 2012/0233237 A1* | 9/2012 | Roa | G06Q 30/02 709/201 |
| 2012/0265875 A1* | 10/2012 | Moran | H04L 41/0253 709/224 |
| 2012/0322515 A1* | 12/2012 | Hwang | H04W 76/068 455/574 |
| 2012/0324041 A1* | 12/2012 | Gerber | H04L 67/26 709/217 |
| 2013/0007255 A1* | 1/2013 | Gerber | G06F 11/302 709/224 |
| 2013/0016736 A1* | 1/2013 | Parnaby | H04L 12/12 370/465 |
| 2013/0179289 A1* | 7/2013 | Calder | G06Q 30/08 705/26.3 |
| 2013/0179574 A1* | 7/2013 | Calder | G06F 9/5033 709/226 |
| 2013/0227060 A1 | 8/2013 | Sheynman et al. | |
| 2013/0315088 A1* | 11/2013 | Gerber | H04L 43/0876 370/252 |
| 2014/0095706 A1 | 4/2014 | Raleigh et al. | |
| 2015/0003361 A1* | 1/2015 | Palat | H04W 52/0258 370/329 |
| 2015/0067682 A1* | 3/2015 | Calder | G06F 9/5033 718/1 |
| 2015/0327057 A1* | 11/2015 | Gerber | H04L 67/26 709/217 |
| 2015/0334173 A1* | 11/2015 | Coulmeau | H04L 67/10 709/203 |

OTHER PUBLICATIONS

Sharma. Simplicity of LTE and its differences with UMTS RRC, posted online on Aug. 6, 2009. http://3g4g.blogspot.com/2009/08/simplicity-of-lte-and-its-differences.html, 2 pages.

UE "Fast Dormancy" Behaviour. 3GPP discussion and decision notes R2-075251, 2007. 3GPP TSG-RAN WG2, Jeju, South Korea, Nov. 5-9, 2007. http://ftp.3gpp.org/specs/html-info/TDocExMtg--R2-60--26016.htm. Last accessed Dec. 9, 2010, 12 pages.

Configuration of Fast Dormancy in Release-8. 3GPP discussion and decision notes RP-090960, 2009, Seville, Spain Sep. 15-18, 2009. http://ftp.3gpp.org/specs/html-info/TDocExMtg--RP-45--26390. htm. Last accessed Dec. 9, 2010, 3 pages.

System Impact of Poor Proprietary Fast Dormancy Implementations. 3GPP discussion and decision notes RP-090941, Seville, Spain, Sep. 15-18, 2009. http://3g4g.blogspot.com/2010/10/fast-dormancy-in-release-8.html. Last accessed Dec. 10, 2010, 2 pages.

(56) References Cited

OTHER PUBLICATIONS

Anand, et al. Self-Tuning Wireless Network Power Management. Wireless Networks, 11(4), 2005, Proceedings of the 9th Annual International Conference on Mobile Computing and Networking, MobiCom'03. http://portal.acm.org/citation.cfm?id=939004&CFID=1282940&CFTOKEN=71026603. Last accessed Dec. 10, 2010, 14 pages.

Balasubramanian, et al. Energy Consumption in Mobile Phones: A Measurement Study and Implications for Network Applications. IMC'09, Nov. 4-6, 2009, Chicago, Illinois, USA; ACM 978-1-60558-770-7/09/11 http://portal.acm.org/results.cfm?h=1&cfid=1282940&cftoken=71026603. Last accessed Dec. 10, 2010, 14 pages.

Chatterjee, et al. Optimal MAC State Switching for cdma2000 Networks. IEEE 0-7803-7476-2/02, INFOCOM 2002. 2002.http://crewman.uta.edu/publicationfiles/cdma-mainak.pdf. Last accessed Dec. 10, 2010, 7 pages.

System Parameter Recommendations to Optimize PS Data User Experience and UE Battery Life, Engineering Services Group, 80-W1112-1, Revision B, Mar. 2007. http://www.qualcomm.co.in/common/documents/white_papers/ESG_Optimizing_PS_Data_User_Experience_RevB.pdf. Last accessed Dec. 10, 2010, 9 pages.

Ghaderi, et al. TCP-Aware Resource Allocation in CDMA Networks. MobiCom'06, Sep. 23-26, 2006, Los Angeles, California, USA. http://delivery.acm.org/10.1145/1170000/1161114/p215-ghaderi.pdf?key1=1161114&key2=4990991921&coll=DL&dl=ACM&CFID=1282940&CFTOKEN=71026603. Last accessed Dec. 10, 2010, 12 pages.

Haverinen, et al. Energy Consumption of Always-On Applications in WCDMA Networks. Proceedings of IEEE Vehicular Technology Conference, 2007. http://www.pasieronen.com/publications/haverinen_siren_eronen_vtc2007.pdf. Last accessed Dec. 20, 2010, 5 pages.

Liu, et al. Experiences in a 3G Network: Interplay between the Wireless Channel and Applications. MobiCom'08, Sep. 14-19, 2008, San Francisco, California, USA. http://citeseerx.ist.psu.edu/viewdoc/summary?doi=10.1.1.142.8214. Last accessed Dec. 20, 2010, 12 pages.

Sridharan, et al. Distributed Uplink Scheduling in CDMA Networks. In Proceedings of IFIP-Networking 2007, May 2007. http://citeseerx.ist.psu.edu/viewdoc/summary?doi=10.1.1.86.5478. Last accessed Dec. 20, 2010, 12 pages.

Zhuang, et al. A3: ApplicationAware Acceleration for Wireless Data Networks. MobiCom'06, Sep. 23-26, 2006, Los Angeles, California, USA. http://www.google.co.in/url?sa=t&source=web&cd=1&ved=0CBYQFjAA&url=http%3A%2F%2Fciteseerx.ist.psu.edu%2Fviewdoc%2Fdownload%3Fdoi%3D10.1.1.135.2488%26rep%3Drep1%26type%3Dpdf&rct=j&q=A3%3A%20Application-Aware%20Acceleration%20for%20Wireless%20Data%20Networks.&ei=NEoPTZLbLYaKlwf9klz1Cw&usg=AFQjCNGrsXHqsbDm7u_Bavg7Kj0Fo2-J_Q. Last accessed Dec. 20, 2010, 12 pages.

Lee, et al. Impact of Inactivity Timer on Energy Consumption in WCDMA and cdma2000 http://ir.lib.nthu.edu.tw/bitstream/987654321/18573/1/2030228030019.pdf. Last accessed Dec. 20, 2010, 10 pages.

Li, et al. Service Quality's Impact on Mobile Satisfaction and Intention to Use 3G Service. Proceedings of the 42nd Hawaii International Conference on System Sciences—2009, IEEE 978-0-7695-3450-3/09. http://www.computer.org/portal/web/csdl/doi/10.1109/HICSS.2009.902. Last accessed Dec. 20, 2010, 10 pages.

Chuah, et al. Impacts of Inactivity Timer Values on UMTS System Capacity. In Wireless Communications and Networking Conference, Mar. 2002, vol. 2, pp. 897-903. http://ieeexplore.ieee.org/Xplore/login.jsp?url=http://ieeexplore.ieee.org/iel5/7793/21424/00993390.pdf%3Farnumber%3D993390&authDecision=-203.

Liers, et al. Static RRC Timeouts for Various Traffic Scenarios. In Proceedings of International Symposium on Personal, Indoor and Mobile Radio Communications (PIMRC), Sep. 3-7, 2007, pp. 1-5. http://ieeexplore.ieee.org/articleSale/Sarticle.jsp?arnumber=4394275.

Liers, et al. UMTS Data Capacity Improvements Employing Dynamic RRC Timeouts. In Proceedings of International Symposium on Personal, Indoor and Mobile Radio Communications, PIMRC, Sep. 11-14, 2005, vol. 4, pp. 2186-2190. http://ieeexplore.ieee.org/xpl/freeabs_all.jsp?arnumber=1651833&abstractAccess=no&userType=.

Talukdar, et al. Radio Resource Control Protocol Configuration for Optimum Web Browsing. In Proceedings IEEE 56th Vehicular Technology Conference, Sep. 24-28, 2002, vol. 3, pp. 1580-1584. http://ieeexplore.ieee.org/xpl/freeabs_all.jsp?arnumber=1040482.

Tan, et al. Measurement-based Performance Model of IP Traffic over 3G Networks. TENCON 2005, IEEE Region 10, pp. 1-5, Nov. 2005. http://ieeexplore.ieee.org/xpl/freeabs_all.jsp?arnumber=4085057.

Yeh, et al. Comparative Analysis of Energy-Saving Techniques in 3GPP and 3GPP2 Systems. IEEE transactions on vehicular technology, 58(1):432-438, Jan. 2009. http://ieeexplore.ieee.org/Xplore/login.jsp?url=http://ieeexplore.ieee.org/iel5/25/4356907/04490170.pdf%3Farnumber%3D4490170&authDecision=-203.

300 Million UMTS Subscribers: Mobile Broadband Goes Global http://www.umts-forum.org/content/view/2522/110/. Downloaded Dec. 14, 2010, 1 page.

Configuration of Fast Dormancy in Release-8. 3GPP discussion and decision notes RP-090960, 3GPP TSG-RAN#45, Sevilla, Spain Sep. 15-18, 2009. Last accessed Feb. 11, 2011, 3 pages.

System Impact of Poor Proprietary Fast Dormancy Implementations. 3GPP discussion and decision notes RP-090941, TSG-RAN meeting #45, Seville, Spain, Sep. 15-18, 2009. Last accessed Feb. 11, 2011, 2 pages.

Falaki, et al. A First Look at Traffic on Smartphones. IMC'10, Nov. 1-3, 2010, Melbourne, Australia. http://research.microsoft.com/en-us/um/people/ratul/papers/imc2010-smartphone-traffic.pdf. Last accessed Feb. 11, 2011, 7 pages.

Balasubramanian, et al. Augmenting Mobile 3G Using WiFi. MobiSys'10, Jun. 15-18, 2010, San Francisco, California, USA. http://research.microsoft.com/en-us/um/people/ratul/papers/mobisys2010-wiffler.pdf. Last accessed Feb. 11, 2011, 13 pages.

Balasubramanian, et al. Energy Consumption in Mobile Phones: A Measurement Study and Implications for Network Applications. IMC'09, Nov. 4-6, 2009, Chicago, Illinois, USA. Last accessed Dec. 15, 2010, 14 pages.

Chakravorty, et al. WWW Performance over GPRS. In IEEE MWCN, 2002. http://www.cl.cam.ac.uk/research/srg/netos/coms/rc277/mwcn_cr.pdf. Last accessed Feb. 11, 2011, 5 pages.

Huang, et al. Anatomizing Application Performance Differences on Smartphones. MobiSys'10, Jun. 15-18, 2010, San Francisco, California, USA. http://research.microsoft.com/pubs/131377/MobiSys10-3GTest.pdf. Last accessed Feb. 11, 2011, 13 pages.

Falaki, et al. Diversity in Smartphone Usage. MobiSys'10, Jun. 15-18, 2010, San Francisco, California, USA. http://portal.acm.org/citation.cfm?id=1814453&CFID=9592070&CFTOKEN=64926078. Last accessed Feb. 11, 2011, 16 pages.

Qian, et al. Characterizing Radio Resource Allocation for 3G Networks. IMC'10, Nov. 1-3, 2010, Melbourne, Australia. Last accessed Dec. 15, 2010, 14 pages.

Qian, et al. TOP: Tail Optimization Protocol for Cellular Radio Resource Allocation. In ICNP, Oct. 5-8, 2010. http://www.eecs.umich.edu/~zmao/Papers/ICNP2010.pdf. Last accessed Feb. 11, 2011, 10 pages.

Schulman, et al. Bartendr: A Practical Approach to Energy-aware Cellular Data Scheduling. MobiCom'10, Sep. 20-24, 2010, Chicago, Illinois, USA. http://www.cs.umd.edu/~schulman/docs/mobicom10-bartendr.pdf. Last accessed Feb. 11, 2011, 12 pages.

Shepard, et al. LiveLab: Measuring Wireless Networks and Smartphone Users in the Field. In Hot-Metrics, 2010. http://hotmetrics.cs.caltech.edu/pdfs/paper12_final.pdf. Last accessed Feb. 11, 2011, 5 pages.

(56) References Cited

OTHER PUBLICATIONS

Zhang, et al. Accurate Online Power Estimation and Automatic Battery Behavior Based Power Model Generation for Smartphones. CODES+ISSS'10, Oct. 24-29, 2010, Scottsdale, Arizona, USA. http://www.eecs.umich.edu/~zhiyunq/pub/powertutor.pdf. Last accessed Feb. 11, 2011, 10 pages.

Qian et al. iMAP: Intelligent Mobile Application Profiling Tool. Last accessed Oct. 13, 2010, 14 pages.

iMAP: Intelligent Mobility Application Profiling Tool. Last accessed Sep. 16, 2010, 6 pages.

Liers. Static RRC Timeouts for Various Traffic Scenarios. In PIMRC, 2007, IEEE 18th International Symposium on Personal, Indoor and Mobile Radio Communications, 2007, Sep. 3-7, 2007, Athens, pp. 1-5. http://ieeexplore.ieee.org/Xplore/login.jsp?url=http://ieeexplore.ieee.org/iel5/4393982/4393983/04394275.pdf%3Farnumber%3D4394275&authDecision=-203.

Yeh, et al. Comparative Analysis of Energy-Saving Techniques in 3GPP and 3GPP2 Systems. IEEE Transactions on Vehicular Technology, Jan. 2009, vol. 58, Issue 1, pp. 432-448. http://ieeexplore.ieee.org/Xplore/defdeny.jsp?url=http://ieeexplore.ieee.org/stamp/stamp.jsp%3Ftp%3D%26arnumber%3D4490170%26userType%3D&denyReason=-134&arnumber=4490170&productsMatched=null&userType=.

Office Action dated Oct. 12, 2012 for U.S. Appl. No. 12/967,627, 19 pages.

Office Action dated Mar. 12, 2013 for U.S. Appl. No. 12/872,604, 27 pages.

Notice of allowance dated May 1, 2013 for U.S. Appl. No. 12/967,627, 17 pages.

Office Action dated Sep. 5, 2013 for U.S. Appl. No. 12/872,604, 53 pages.

Office Action dated Dec. 18, 2013 for U.S. Appl. No. 13/164,112, 38 pages.

Office Action dated Jul. 2, 2014 for U.S. Appl. No. 13/164,112, 13 pages.

Office Action dated Jul. 16, 2014 for U.S. Appl. No. 13/528,423, 13 pages.

Office Action dated Jan. 26, 2015 for U.S. Appl. No. 13/528,423, 36 pages.

Office Action dated Feb. 24, 2016 for U.S. Appl. No. 14/996,033, 42 pages.

\* cited by examiner

TAIL OPTIMIZATION PROTOCOL FOR CELLULAR RADIO RESOURCE ALLOCATION

CROSS REFERENCE TO RELATED APPLICATIONS

This application is a continuation of, and claims priority to, U.S. patent application Ser. No. 12/872,604, entitled "TAIL OPTIMIZATION PROTOCOL FOR CELLULAR RADIO RESOURCE ALLOCATION" filed on Aug. 31, 2010. The entirety of the above-referenced U.S. Patent Application is incorporated herein by reference.

TECHNICAL FIELD

This disclosure relates generally to network communications and, more specifically to managing operation of devices utilizes within a wireless communication network.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as Universal Mobile Telecommunications System (UMTS), Third Generation Partnership Project (3GPP) Long Term Evolution (LTE), High Speed Packet Access (HSPA). These specifications and/or standards use different modulation techniques, such as Code Division Multiple Access (CDMA), Time Division Multiple Access (TDMA), Frequency Division Multiple Access (FDMA), Multi-Carrier CDMA (MC-CDMA), Single-Carrier CDMA (SC-CDMA), Orthogonal Frequency Division Multiple Access (OFDMA), Single-Carrier Frequency Division Multiple Access (SC-FDMA), and so on.

In various wireless network deployments, such as third generation (3G) cellular networks or the like, the release of radio resources can be controlled by inactivity timers. However, the timeout value itself, also known as the tail time, can have a significantly long duration (e.g., up to 15 seconds) due to the necessity of trading off resource utilization efficiency for low management overhead and good stability. This, in turn, can result in wastage of a considerable amount of radio resources and battery energy associated with respective user handsets. Accordingly, it would be desirable to implement techniques for effectively mitigating such tail effects and/or other similar barriers to efficient device performance in a wireless communication system.

DETAILED DESCRIPTION

Figure 1:
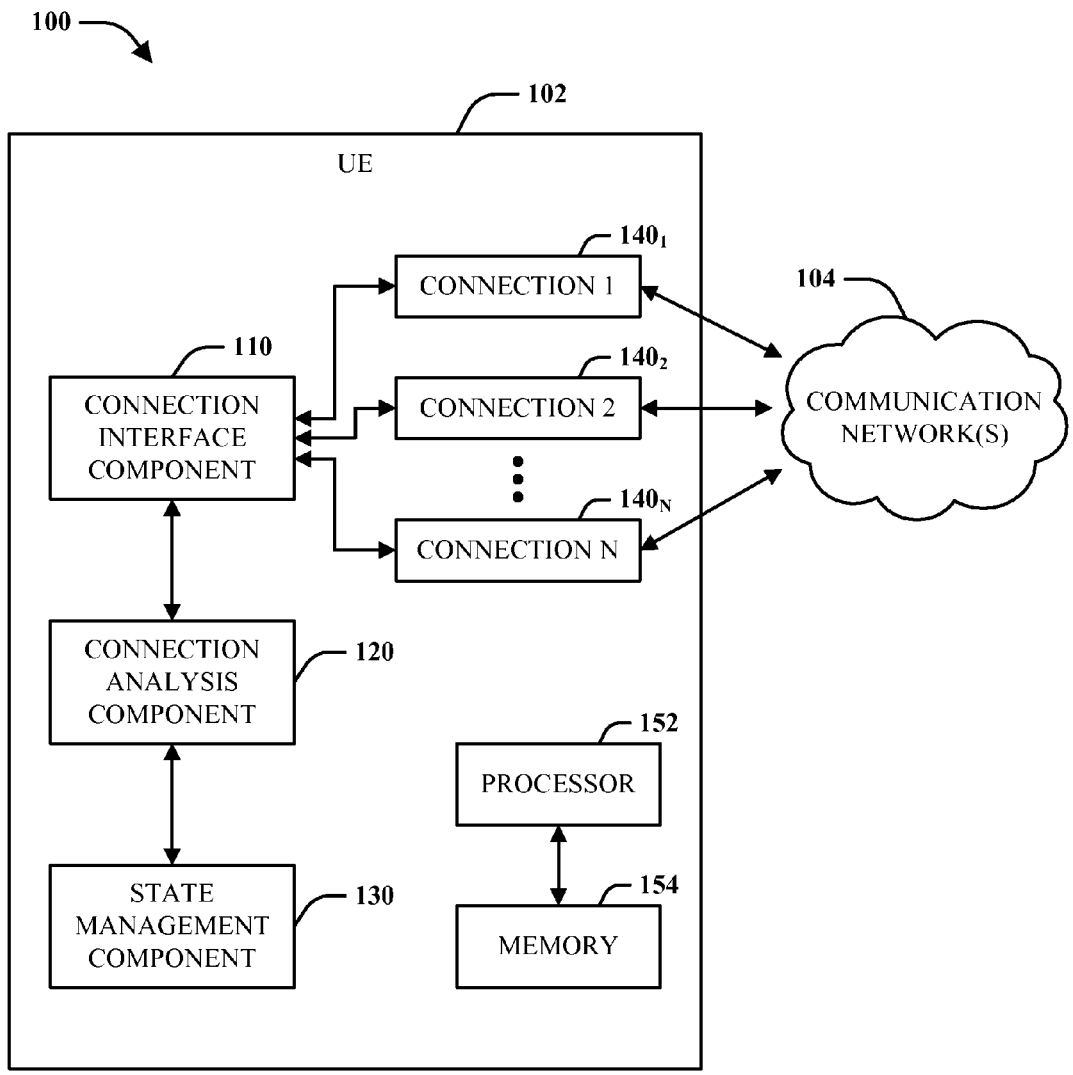
FIG. 1 is a block diagram of a system for optimizing operation of a network device in accordance with various aspects described herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (eNode B or eNB), "Home Node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

Various aspects described herein provide, via a novel Tail Optimization Protocol (TOP) and/or other mechanisms, systems and methods for enabling cooperation between a mobile device and an associated radio access network to eliminate tails as described above when possible. Various systems and methods described herein can leverage the ability of applications to accurately predict a long tail time, from which an associated mobile device can notify an associated cellular network on such an imminent tail in order to allow the cellular network to immediately release tail resources.

Various other aspects provided herein realize TOP via fast dormancy, which is a notification mechanism that enables a handset to notify a cellular network for immediate resource release. Thus, by utilizing fast dormancy, TOP can in some aspects be implemented with no required change to the cellular infrastructure and only minimal required changes to handset applications, thereby incurring only negligible runtime overhead. By utilizing TOP and/or other mechanisms described herein in combination with reasonable prediction accuracy, radio energy and radio resource savings can be realized by significantly reducing tail time. Further, for some applications such as multimedia streaming, the use of TOP and/or other mechanisms described herein can result in significant (e.g., 50-60%) savings in radio energy and/or radio resources.

In accordance with one aspect, a method as described herein can be implemented by at least one processor and/or other means. The method can include the acts of identifying at least one connection utilized for communication within a communication system, obtaining information relating to respective predicted data transfer times associated with the at least one connection, calculating an estimated inter-transfer time based on the respective predicted data transfer times, and determining whether to trigger a transition to an idle communicative state independently of timing requirements associated with the transition to the idle communicative state at least in part by comparing the estimated inter-transfer time to a threshold, referred to herein as a tail threshold. In one example, radio resources can be released (e.g., by demoting the communicative state) if the estimated inter-transfer time is shorter than the tail threshold.

In accordance with another aspect, a system that can be implemented as described herein can include a connection interface component that facilitates retrieval of information relating to one or more connections utilized for communication within a communication system. The system can also include a connection analysis component that identifies respective predicted data arrival times indicated by the one or more connections via the connection interface component and estimates an inter-transfer time for the one or more connections as a function of the respective predicted data arrival times. In addition, the system can include a state management component that determines whether to initiate a transition to an idle state independently of timing requirements associated with the transition to the idle state at least in part by comparing the inter-transfer time for the one or more connections to a tail threshold.

In accordance with a further aspect, a computer-readable medium is described herein, which can include a computer-readable storage medium having computer-executable code and/or other data stored thereon. More particularly, the computer-readable medium can include code for causing a computer to identify one or more network connections, code for causing a computer to obtain respective predicted data transfer times associated with the one or more network connections, code for causing a computer to calculate an inter-transfer time based on the respective predicted data transfer times, code for causing a computer to conduct a comparison of the inter-transfer time and a predetermined tail threshold, and code for causing a computer to determine whether to facilitate transition to an idle state via invocation of a fast dormancy mechanism based at least in part on the comparison.

Referring now to the drawings, FIG. 1 illustrates a system 100 for optimizing operation of a network device, such as a UE 102, in accordance with various aspects described herein.

As FIG. 1 illustrates, UE 102 can include a connection interface component 110, which can facilitate retrieval of information relating to one or more connections 140 utilized by UE 102 for communication within a wireless communication system. For example, as shown in system 100, respective connections 140 utilized by UE 102 can communicate with one or more communication networks 104, which can in turn provide one or more communication services (e.g., voice, data, multimedia, etc.) for UE 102.

As further shown by system 100, UE 102 can include a connection analysis component 120, which can identify respective predicted data arrival times indicated by connection(s) 140 via connection interface component 110 and estimate an inter-transfer time for connection(s) 140 as a function of the respective predicted data arrival times. Based on this information, UE 102 can further include a state management component 130, which can determine whether to initiate a transition to an idle state independently of timing requirements (e.g., a tail time and/or other delay intervals as described herein) associated with the transition to the idle state at least in part by comparing the inter-transfer time for connection(s) 140 as computed by connection analysis component 120 to a tail threshold. For example, state management component 130 can initiate a transition to an idle state if the inter-transfer time for connection(s) 140 is substantially greater than the tail threshold.

In one example, operation of connection interface component 110, connection analysis component 120, state management component 130, and/or any other mechanisms associated with connections 140 or other aspects of UE 102 can be implemented wholly or in part and/or otherwise facilitated by a processor 152, which can be coupled to a memory 154 for storing data, program codes to be executed by processor 152, and/or other information. Operation of UE 102 in the context of at least the above components is described in further detail below.

In cellular communication networks and/or other communication networks 104 with which UE 102 in system 100 can be associated, the release of radio resources can be controlled by inactivity timers. However, the timeout value itself, also known as the tail time, can have a substantially long duration (e.g., up to 15 seconds). In one example, the tail time can be empirically chosen to balance the tradeoff among radio resource utilization, user experiences, energy consumption, and the network processing overhead, based on observed traffic patterns. Further, as the tail time is an idle time period corresponding to the inactivity timer value before radio resources are released, observation of the tail time can lead to waste in radio resources and battery energy of UEs 102 (e.g., mobile phones, etc.). By way of illustration, based on analysis of data collected from one or more cellular providers, a significant portion of the time occupying high-speed dedicated transmission channels (e.g., 20-25%) is wasted on the tail, as a result of the bursty nature of the traffic.

In the following description, focus is placed on the UMTS 3G network; however, it should be appreciated that the aspects described herein could be applied to any suitable network technology or combination thereof. In one example, to manage radio resources and UE energy, a UMTS network can maintain a radio resource control (RRC) state machine for each UE. Thus, for example, a UE can be in one of three states, each with different amount of radio resources allocated affecting user performance and the UE energy consumption. In such an example, a UE can be configured to always experience a tail, which is formally defined as the idle time period matching the inactivity timer value before a state demotion, whenever the state is demoted from a state with larger amount of resource to one consuming less resource. However, frequent state transitions, particularly state promotions, can in some cases lead to unacceptably long delays for the UEs due to additional processing overhead for the radio access network. In view of at least the above, techniques are provided herein for mitigating the tail effect in UMTS networks and other suitable telecommunication networks.

Existing approaches for tail removal can be classified into various categories. In a first example, inactivity timer tuning can be performed using analytical models by considering the radio resource utilization, the UE energy consumption, the service quality, and the processing overhead of the radio access network. However, it can be appreciated that mitigation of the tail effect in this manner requires reducing the inactivity timers, which invariably causes the number of state transitions to increase. In a specific illustrative example, aggressively reducing the most critical timer from 5 s to 0.5 s can reduce the tail time by 50%; however, in the same example the state promotion delay increases by about 300%. It can be appreciated that this is undesirable, as the increase in state promotions introduces significant processing overhead for the radio access network.

Alternatively, a second example involving UE-based approaches can be utilized, in which the UE alters traffic patterns based on the inferred dynamic behavior of the RRC state machine. For delay-tolerant applications such as Email and RSS feeds, the transfers can be delayed and batched using such an approach to reduce the tail time. However, it can be appreciated that such an approach is not applicable to most real-time traffic (e.g., Web browsing), and as a result the users corresponding to such traffic can in some cases experience delays in the processing of their requests.

In another alternative, a third example involving cooperation between the UE and the network can be utilized. For example, in some cases a UE application may be able to predict the end of a data transfer based on the application logic. Accordingly, if an idle time period that lasts at least as long as the inactivity timer value is predicted, the UE can send a message to notify the network, which then immediately releases the allocated resources. It can therefore be appreciated that such an approach can completely eliminate the tail if the prediction is accurate, without incurring additional promotion delays. Various network features, such as fast dormancy, can be utilized within communication networks (e.g., 3GPP networks, etc.) to help realize such an approach. However, while various handsets have adopted fast dormancy and/or similar mechanisms, there has been no investigation into how to make use of such mechanisms from the perspective of the UE. Further, no smartphone application to date uses fast dormancy and/or other similar mechanisms, due to a lack of operating system (OS) support and other factors. Based on measuring device power consumption, it can be observed that one or more recently released mobile handset devices can utilize fast dormancy in an application-agnostic manner, such that, for example, the device goes to the idle state faster than conventional phones do for the same carrier. Equivalently, it can be observed that these devices use shorter inactivity timers as controlled by the device in order to improve battery life. However, as noted above, the incurred drawbacks using such an approach include extra state promotions that cause additional RNC processing overhead and worsen user experience.

In view of at least the above, UE 102 in system 100 and its respective components and/or other associated entities can implement a Tail Optimization Protocol (TOP), which is an application-layer protocol that bridges the gap between applications and fast dormancy support provided by the communication network 104. In accordance with one aspect, TOP can be implemented at UE 102 via changes to the OS and/or associated applications, taking into account the implication of multiple concurrent connections using fast dormancy. By way of example, TOP can be utilized to address at least three issues associated with allowing network applications to benefit from this support.

In a first example, various aspects described herein provide a simple interface for different applications to leverage fast dormancy and/or other similar features. For example, a framework can be provided in which applications define their logical transfers and perform predictions of inter-transfer time. Subsequently, an application can invoke a tail removal application programming interface (API) and/or other means provided by TOP that automatically coordinates concurrent traffic of multiple applications, as state transitions are determined by the aggregated traffic of all applications. By implementing TOP in this fashion, it can be appreciated that the overhead for tail removal experienced by applications is substantially minimized. While various examples are provided herein for the case of a UMTS network, it should be appreciated that a framework constructed in this manner can be applicable to any other suitable communication system, such as 3G Evolution-Data Optimized (EvDO), 4G LTE cellular networks, and/or any other suitable network(s) that also use inactivity timers for releasing radio resources and therefore have the tail effect.

In a second example, by using cellular traces collected from carrier data, the tail effect can be quantified for a substantially large number of user sessions. By doing so, it can be observed that for the two RRC states, a significant amount of time (e.g., 20-25% and 50-55%, respectively) is spent on the tail. By using these traces, various techniques described herein can additionally be utilized to empirically derive critical parameters used by TOP to properly balance the tradeoff between resource saving and state transition overhead.

In a third example, the benefits of TOP can be demonstrated using real traces collected from carriers and/or devices operating via such carriers. Based on these data and assuming reasonable prediction accuracy, TOP can save overall the radio energy (e.g., up to approximately 17%) and the radio resources (e.g., up to approximately 14%) by reducing the tail time (e.g., by up to approximately 60%). Further, for some applications such as multimedia streaming, TOP can achieve more significant savings of the radio energy (e.g., up to approximately 60%) and the radio resources (e.g., up to approximately 50%).

Figure 2:
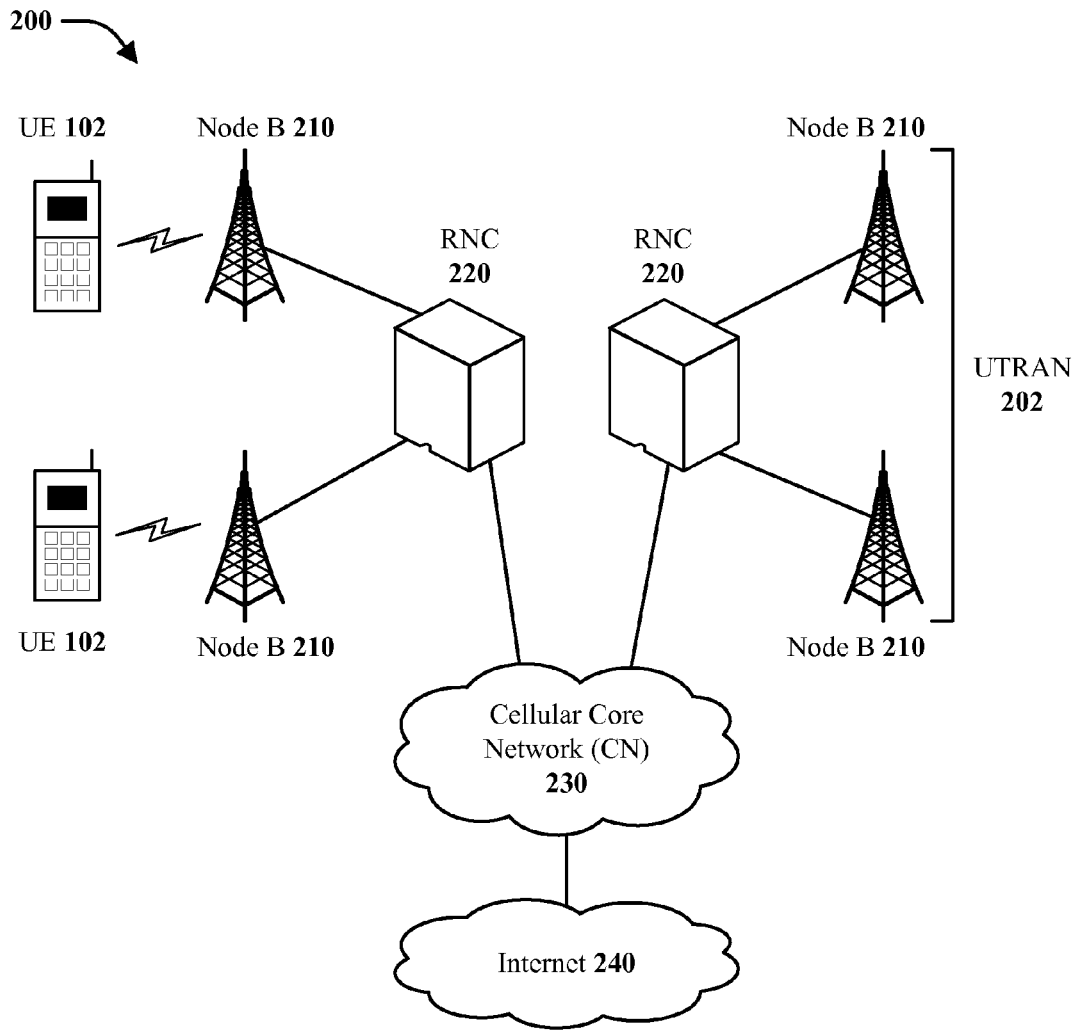
FIG. 2 illustrates an example wireless network environment in which various aspects described herein can function.

In accordance with one aspect, TOP and/or other techniques for managing the operating state of a UE 102 can operate in the context of one or more communication networks 104. By way of specific, non-limiting example, FIG. 2 illustrates a UMTS network 200 in which various aspects described herein can operate. As illustrated by FIG. 2, the UMTS network 200 can include three subsystems: UEs 102, the UMTS Terrestrial Radio Access Network (UTRAN) 202, and the Core Network (CN) 230. As used in UMTS network 200, UEs 102 can be mobile handsets that interact with end users, and/or any other suitable device(s). In one example, UTRAN 202 can enable connectivity between UE 102 and CN 230. UTRAN 202 can include two components: base stations, which are referred to as Node Bs 210, and Radio Network Controllers (RNCs) 220, which provide control functionalities for multiple Node Bs 210. In one example, a substantial number of the features of UTRAN 202 (e.g., packet scheduling, radio resource control, handover control, etc.) can be implemented at the RNC 220. In another example, the centralized CN 230 can be regarded as the backbone of the cellular network and can serve as an interface to other networks, such as the Internet 240.

Returning to FIG. 1 in the context of UMTS network 200, the term "radio resource" as used herein refers to the Wideband CDMA (WCDMA) code space, the UTRAN transmission power, and/or other factors that are potential bottlenecks of the network. To efficiently utilize the limited radio resources, the UMTS RRC protocol introduces a state machine associated with each UE 102. By way of example, the RRC state machine can utilize three RRC states—IDLE, CELL_FACH, and CELL_DCH, as shown by diagrams 302 and 304 in FIG. 3.

As shown in diagrams 302 and 304, IDLE is the default state when the UE is turned on. In this state, the UE has not established an RRC connection with the RNC; thus, no radio resource is allocated and the UE cannot transfer any data.

In the CELL DCH state, the RRC connection is established and a UE can be allocated dedicated DCH transport channels in both downlink (DL), e.g., RNC to UE, and uplink (UL), e.g., UE to RNC. This state allows the UE to fully utilize the radio resources for user data transmission. For brevity, the CELL_DCH state is also referred to herein as simply "DCH." In one example, when a large amount of UEs are in DCH, the radio resources can in some cases be exhausted due to the lack of channelization codes in the cell. As a result, some UEs may be required to use low-speed shared channels, although in such a case their RRC states remain at DCH.

In the CELL_FACH state, the RRC connection is established but there is no dedicated channel allocated to the UE. Instead, the UE can only transmit user data through shared low-speed channels (e.g., less than 20 kbps). For brevity, the CELL_FACH state is also referred to herein as simply "FACH." FACH is generally designed for applications requiring very low data throughput rate.

In accordance with one aspect, the various RRC states impact the radio energy consumption of a UE. For example, as shown by diagrams 302 and 304, a UE at the IDLE state consumes almost no energy from its wireless network interface. While a device operates within the same state, the radio power can be substantially stable regardless of the data throughput. In one example, the RRC state machine can be maintained at both the UE and the RNC. In such a case, the two peer entities can be synchronized via control channels except, e.g., during transient and error situations. In another example, both the DL and the UL can utilize the same state machine.

According to another aspect, there are two types of RRC state transitions. State promotions, including IDLE to FACH, IDLE to DCH, and FACH to DCH, switch an associated device from a state with lower radio resources and UE energy utilization to another state consuming more resources and UE energy. Conversely, state demotions, including DCH to FACH, FACH to IDLE, and DCH to IDLE, go in the reverse direction. Depending on the starting state, a state promotion is triggered by differing means. For example, if the UE is at idle, a state promotion is triggered by either any user data (as opposed to control data) transmission activity. If the UE is at FACH, a state promotion is triggered by the per-UE queue size, called the Radio Link Controller (RLC) buffer size, exceeding a threshold in either direction.

In another example, state demotions can be triggered by inactivity timers maintained by the RNC. For example, a timer controlling demotion from DCH to FACH is referred to herein as $\alpha$, and a timer controlling FACH to IDLE demotions is referred to herein as $\beta$. At DCH, the RNC can reset the $\alpha$ timer to a fixed threshold T whenever it observes any UL/DL data frame. Accordingly, if there is no user data transmission for T seconds, the α timer times out and the state is demoted to FACH. A similar scheme can be used for the β timer. As shown by diagrams 302 and 304, the threshold T assigned to timers α and β can depend on implementation. For example, diagram 302 illustrates a system with α set to 5 s and β set to 12 s, while diagram 304 illustrates a system with α set to 6 s and β set to 4 s.

It can be appreciated that promotions can involve more work than demotions. In particular, state promotions can incur a long "ramp-up" latency of up to 2 seconds, during which tens of control messages are exchanged between a UE and RNC for resource allocation. Excessive state promotions thus increase the processing overhead at the RNC and degrade user experience, especially for short data transfers.

Figure 3:
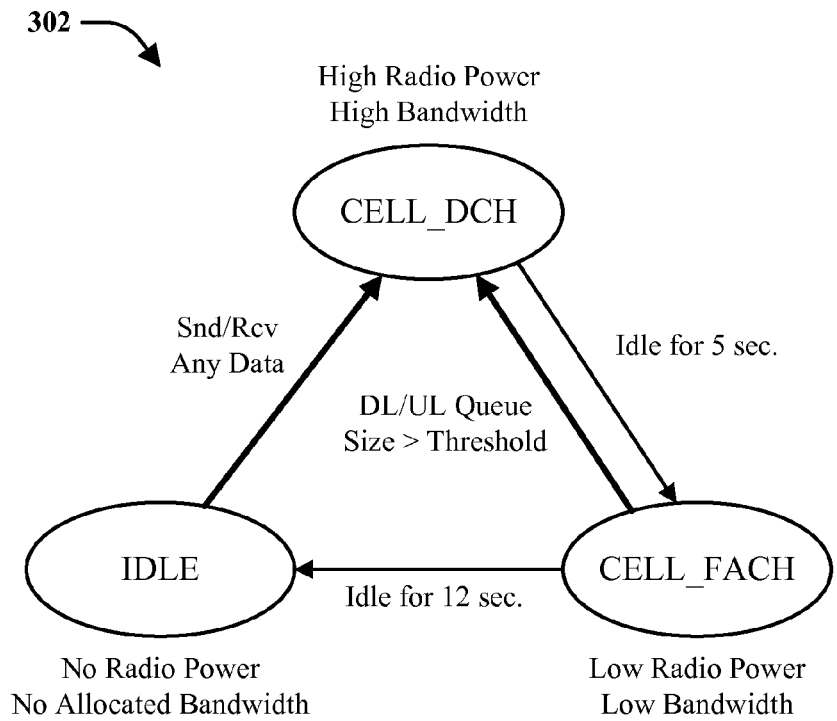
FIG. 3 illustrates example state transition schemes that can be utilized by a wireless terminal in accordance with various aspects.
Figure 3:
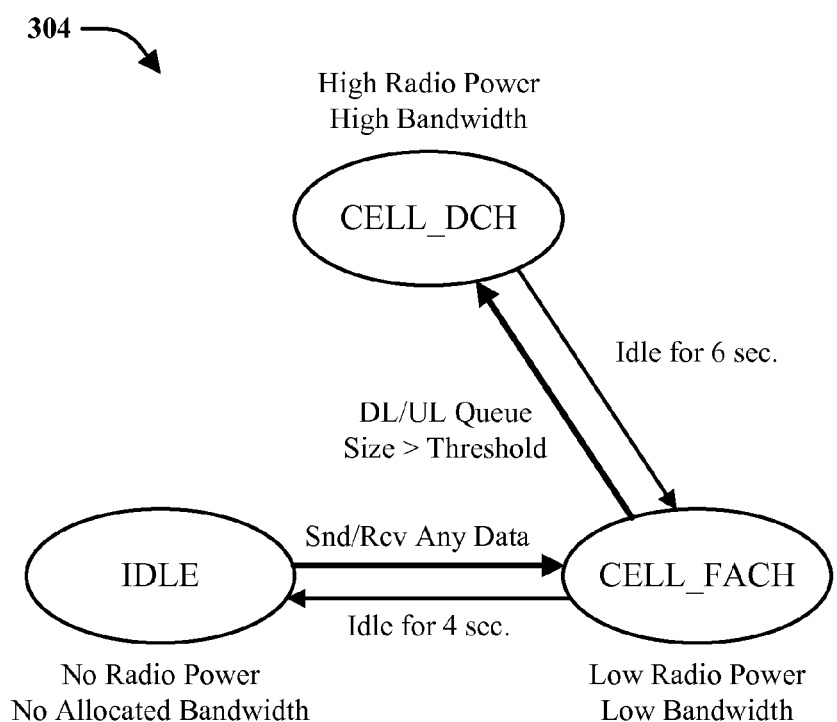

Diagrams 302 and 304 in FIG. 3 depict state transition diagrams for respective UMTS carriers, herein denoted "Carrier 1" and "Carrier 2," whose state machine parameters (under good signal strength conditions) are listed in Table I below. In accordance with one aspect, such data and/or other information collected via system analysis can be utilized to characterize the tail effect of a system.

TABLE I

Inferred state machine parameters for two example carriers.

|  | Carrier 1 | Carrier 2 |
|---|---|---|
| Inactivity timer |  |  |
| α: DCH to FACH | 5 sec | 6 sec |
| β: FACH to IDLE | 12 sec | 4 sec |
| Promotion time |  |  |
| IDLE to FACH | N/A | 0.6 sec |
| IDLE to DCH | 2 sec | N/A |
| FACH to DCH | 1.5 sec | 1.3 sec |
| RLC Buffer threshold |  |  |
| FACH to DCH (UL) | 543 ± 25 B | 151 ± 14 B |
| FACH to DCH (DL) | 475 ± 23 B | 119 ± 17 B |
| State radio power |  |  |
| DCH/FACH/IDLE | 800/460/0 mW | 600/400/0 mW |
| Promotion radio power |  |  |
| IDLE to FACH | N/A | 410 mW |
| IDLE to DCH | 550 mW | N/A |
| FACH to DCH | 700 mW | 480 mW |

Figure 4:
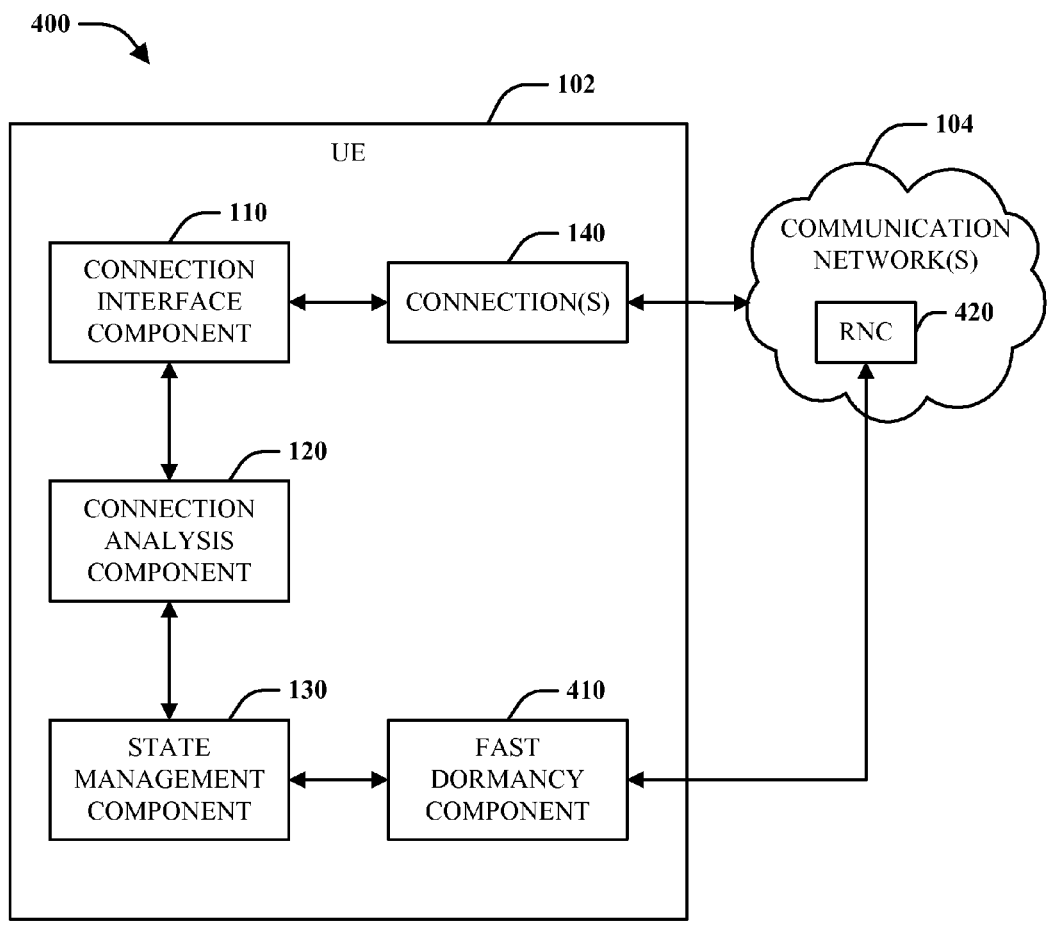
FIG. 4 is a block diagram of a system for leveraging a fast dormancy mechanism to expedite operating state transitions relating to a user device in accordance with various aspects.

In accordance with one aspect, a network device and/or other entity can utilize TOP to invoke fast dormancy support and/or other suitable mechanisms to directly trigger a DCH to IDLE or FACH to IDLE demotion without experiencing timeout periods, in order to save radio energy and radio resources. For example, as illustrated by system 400 in FIG. 4, a UE 102 can utilize a fast dormancy component 410 in cooperation with a state management component 130 as described herein to initiate a transition to an idle state at least in part by conducting a fast dormancy messaging procedure with an associated network management entity, such as a RNC 420 associated with communication network(s) 104.

However, it can be appreciated that triggering state demotions aggressively can in some cases incur unacceptably long delay of state promotions, worsening user experiences and increasing the processing overhead at RNC 420. Accordingly, TOP and/or other techniques that can be utilized by UE 102 can employ a set of novel techniques to address at least this issue. In one example, the techniques described herein can be implemented without requiring changes at the firmware or hardware of UE 102 given that fast dormancy and/or other suitable procedures are widely deployed and transparent to the radio access network.

According to an aspect, TOP and/or other techniques as described herein can leverage the knowledge of applications that predict the idle period after each data transfer. The definition of a data transfer can be made dependent on the application. In one example, fast dormancy is not invoked if the predicted idle period is smaller than a predefined threshold (e.g., the tail threshold) in order to prevent unnecessary state promotions. By leveraging this knowledge of respective applications (and/or their corresponding connections 140), an interface is provided by which applications can intelligently predict an idle period, such that fast dormancy is only invoked when the idle period is longer than the tail threshold.

According to another aspect, the value of the tail threshold and other parameters used by TOP can be tuned by empirically measuring traces collected from a network carrier, in order to well balance the tradeoff between the incurred state promotion overhead and the resource savings.

According to a further aspect, RRC state transitions can be determined by the aggregated traffic of all applications running on a UE 102. However, as respective applications may be capable only of predicting their own transfer times, a global coordination algorithm can be utilized in connection with TOP to handle concurrent network activities. In another example, TOP and/or other suitable techniques utilized by UE 102 as described herein can consider legacy applications that are unaware of such techniques. Various examples by which the above aspects can be realized are described in further detail below. For example, a non-limiting example coordination algorithm that can be utilized according to various aspects herein is shown below in Table III.

In the DCH or FACH states, when there is no user data transmission in either direction for at least T seconds (e.g., the inactivity timer value), the RRC state can be demoted as noted above to save radio resources and UE energy. However, during the wait time of T seconds, it can be appreciated that an associated UE 102 still occupies the transmission channel and the WCDMA codes, and the radio power consumption is kept at the corresponding level of the state. As used herein, a "tail" is defined as the idle time period matching the inactivity timer value before a state demotion. Further, any non-tail time is defined herein as "active." In typical UMTS and/or other networks, each UE 102 can be allocated a dedicated channel, whose radio resources are substantially wasted during the tail time. By way of example relating to High-Speed Downlink Packet Access HSDPA, which is a UMTS extension with higher downlink speed, occupying the high speed transport channel during the tail time can potentially prevent other UEs from using the high speed channel despite the fact that the channel is shared by only a limited number of UEs (e.g., 32). Furthermore, it can be appreciated that staying in DCH or FACH during the tail time wastes the radio energy of the UE, which can contribute to a significant portion (e.g., at least half) of the total battery energy consumption at a UE or other such device.

From the perspective of a network carrier, it can be noted that one option for mitigating the tail effect is to reduce the inactivity timer values. However, doing so increases the number of state transitions. As described above, completing a state promotion can take, e.g., up to 2 seconds, during which tens of control messages are exchanged between a UE and the RNC. Such a delay degrades end user experiences and increases the CPU processing overhead of the RNC, which is much higher for handling state transitions than for performing data transmission.

In order to quantify the tradeoff among the factors of the radio resource consumption, the UE energy consumption, the state promotions, and the end user experiences, a series of metrics can be computed: $D^T$, D, S, and E, as shown in Table II below. In particular, the DCH tail time $D^T$ captures the radio resources (the WCDMA codes) wasted on tails that can potentially be saved. Second, the total DCH time D consists of DCH tail time ($D^T$) and DCH active time (e.g., non-tail time). It quantifies the overall radio resources consumed by the UE on dedicated DCH channels (e.g., ignoring the radio resources allocated for shared low-speed FACH channels). Third, the total promotion delay S is the total duration of all promotions. It abstracts the overhead brought by the state promotions that worsens the user experience and increases the processing overhead at the RNC. In one example, the state demotion overhead can be ignored because it is negligible compared to the state promotion overhead. Fourth, the radio energy consumption E is the total radio energy consumed in all states and state promotions.

TABLE II

| Radio resource operation tradeoffs. | |
| --- | --- |
| Increase α and β timers | Decrease α and β timers |
| $\Delta D^T$ and ΔD increase | $\Delta D^T$ and ΔD decrease |
| Increase tail time | Decrease tail time |
| Waste radio resources | Save radio resources |
| ΔS decreases | ΔS increases |
| Reduce state promotions | Increase state promotions |
| Reduce RNC overhead | Increase RNC overhead |
| Improve user experience | Degrade user experience |
| ΔE increases | ΔE decreases |
| Waste UE radio energy | Save UE radio energy |

According to an aspect, $D^T$, D, S and E can be computed using the simulation-based approach described above and, e.g., the parameters listed in Table I above. When changing the inactivity timer values or using a new technique for tail removal, the relative change of $D^T$, D, S and E can be analyzed as compared to the default setting where the default state machine parameters (e.g., as shown in Table I) are used without removing tails. Let $D_1^T$ and $D_0^T$ be the DCH tail time in the new setting and in the default setting, respectively. Accordingly, the relative change of $D^T$, denoted as $\Delta D^T$, can be computed by $\Delta D^T = (D_1^T - D_0^T)/D_0^T$. Similar definitions can be used for ΔD, ΔS and ΔE, which are further utilized below.

With reference again to FIG. 4, it can be appreciated that the fundamental reason why inactivity timers are conventionally necessary is that a communication network 104 does not have an easy way of predicting network idle time of the UE 102. Therefore, the RNC 420 conservatively appends a tail to every network usage period. To avoid this, applications at the UE 102, and/or their corresponding connections 140, can be configured to determine the end of a network usage period by making use of application knowledge useful for predicting network activities. Once an imminent tail is predicted, the UE 102 can notify the RNC 420 via fast dormancy component 410, which then prompts a substantially immediate release of resources by RNC 420.

Based on the concepts above, a feature called fast dormancy has been proposed for inclusion in various communication system specifications (e.g., 3GPP Release 7 and Release 8, etc.). Using fast dormancy, the UE 102 can send an RRC message, referred to herein as a T message, to the RNC 420 through the control channel. Upon the reception of a T message, the RNC 420 releases the RRC connection and lets the UE 102 go to IDLE (or a hibernating state that has lower but still non-trivial promotion delay). While this feature has limited handset support, no network device applications currently use fast dormancy in practice, partly due to a lack of OS support and/or a simple programming interface.

In accordance with one aspect, UE 102 in system 400 can be utilized to implement TOP, which is an application-layer protocol that leverages the support of fast dormancy to remove tails. In TOP, applications (e.g., applications associated with respective connections 140) can define data transfers and predict the inter-transfer time at the end of each data transfer using a provided interface. If the predicted inter-transfer time is greater than a tail threshold, the application can then inform the RNC, e.g., via state management component 130 and fast dormancy component 410, to initiate fast dormancy. In accordance with various aspects, techniques for setting the tail threshold and handling concurrent network activities are described herein. It can be appreciated that the TOP design provided herein can be implemented with minimal required change to UE applications (and optionally server applications, as the server can provide the UE with hints about predicting a tail) and the UE OS, and substantially no change at the firmware/hardware of the UE 102. In an aspect, TOP is transparent to the UTRAN (e.g., the Node B 210 and the RNC 220, as shown in FIG. 2) and the cellular core network (e.g., CN 230 in FIG. 2). Therefore, it can be appreciated that TOP can be incrementally deployable. In another aspect, the T message as used herein can be pre-supported by the RNC 420.

In accordance with one aspect, tail eliminations can be performed from the perspective of applications running at UE 102 for each data transfer, which can be defined by the applications to capture a network usage period. For example, a data transfer can correspond to all packets belonging to the same Hypertext Markup Language (HTML) page. To use TOP, an application can be required only to ensure that the current data transfer has ended and to provide TOP with its predicted delay between the current and the next data transfer, denoted as the inter-transfer time (ITT), via a provided interface (e.g., implemented using connection interface component 110). In one example, ITT can be defined as the packet inter-arrival time between the last packet of a transfer and the first packet of the next transfer. In another example, DL and UL packets can be handled without differentiation as both use the same state machine.

By way of specific example, a scenario with no concurrent activities can be considered. In such a case, TOP, via state management component 130 or the like, can send a T message (e.g., invoking fast dormancy via fast dormancy component 410) to eliminate the tail if the predicted ITT is longer than a threshold herein referred to as a tail threshold (TT) that introduces the tradeoffs described above. For example, a large TT value limits the radio resource and energy saving achieved by TOP, while a small TT value incurs extra state promotions. Techniques for choosing the TT are provided in further detail below.

In accordance with one aspect, ITT prediction can be application-specific. For example, it may be easier to predict ITT for applications with regular traffic patterns, with limited or no user-interaction (e.g., video streaming), while it may be more difficult for user-interactive applications, such as Web browsing and map applications, as user behavior can inject randomness to the packet timing. By way of example, in Web browsing, each transfer can correspond to downloading one HTML page with all embedded objects. As another example, an e-mail application can define a transfer as a request for checking for sending and/or receiving messages. In the example of a Web browser, the browser can have exact knowledge of when the page has been fully downloaded. However, the timing gap between two consecutive transfers may be shorter than the tail threshold (e.g., the user can quickly navigate between pages). Thus, the browser can selectively invoke TOP. By way of a second example, a multimedia streaming transfer can consist of a single burst of packets of video/audio content. A multimedia streaming application can usually predict termination of a streaming burst, and therefore TOP can be applied if the timing gap between two consecutive bursts (usually known by the application) is longer than the TT. As a third example, interactive map applications involve continuous user-interactions; thus, TOP may not be applicable as it is difficult to define a transfer.

It can be appreciated that ITT prediction by respective applications and/or connections 140 can be associated with various issues. As a first example, applications and/or connections 140 may in some cases not predict ITT accurately: misprediction can lead to increased promotion overhead due to false positives (e.g., falsely predicting a short ITT that is less than the TT to be a long ITT that is greater than the TT) or missing opportunities for tail removal due to false negatives (e.g., falsely predicting a long ITT to be short). For simplicity of description, however, it is assumed herein that ITTs are predicted with a reasonable accuracy (e.g., 80% to 90%).

In a second example, the existence of concurrently running applications and independent components of the same application (e.g., a streaming application with an advertisement bar embedded) can further complicate tail prediction. Further, it can be appreciated that applications cannot predict the concurrent network activities of other applications that can that affect state transitions. Accordingly, TOP as utilized by system 400 can assume responsibility for handling this concurrency, as described in further detail below.

In accordance with one aspect, unlike the applications as described above, TOP as implemented by a UE 102 can in some cases be unaware of the way applications define their transfers. Instead, TOP can schedule tail removal requests at the connection level. A connection can be defined by five tuples: srcIP, dstIP, srcPort, dstPort, and protocol (Transmission Control Protocol/User Datagram Protocol or TCP/UDP). It can be appreciated that it is possible for either one connection to contain multiple transfers or for one transfer to involve multiple connections. At the end of a transfer, after the last packet is transmitted, an application can inform TOP via a simple API, herein referred to as TerminateTail(c, $\delta$) that the predicted ITT of connection c is $\delta$. In other words, the next UL/DL packet of connection c belongs to the next transfer and will arrive after $\delta$ time. Let the real ITT be $\delta_0$ and the predicted ITT be $\delta$.

When user interactions are involved, it may be difficult for applications to predict the exact value of ITT. In such a case, an application can perform binary prediction, e.g., to predict whether ITT≤TT or ITT>TT. In such an example, the API is only called in the latter case: if ITT is predicted to be greater than TT, then TerminateTail(c, $\delta$) can be invoked with $\delta$ set to a fixed large value (e.g., 60 sec). In one example, when no concurrent network activities exist, exact prediction of ITT can in some cases be unnecessary provided the binary prediction is correct. On the other hand, when concurrency exists, the predicted ITT value may affect how fast dormancy is invoked. For example, in an example wherein the real ITT is denoted by $\delta_0$ and the predicted ITT is denoted by $\delta$, it can be appreciated that underestimating $\delta_0$ ($\delta<\delta_0$) may in some cases prevent other concurrent applications from invoking fast dormancy while overestimating $\delta_0$ ($\delta>\delta_0$) may in some cases incur additional state promotions. However, as noted above, in the event that binary prediction is correct, the actual prediction value of ITT can be of lesser significance in some cases.

In one example, calling TerminateTail(c, $\delta$) can be used to indicate that the next transfer belongs to an established connection c. In addition, an application can start the next transfer by establishing a new connection that does not exist when TerminateTail is called. For example, a Web browser can use a new TCP connection for fetching a new page. Suppose that at the end of a connection c, the application makes a prediction that the next transfer initiates a new connection and the ITT is $\delta$. In that case, the application can make two consecutive calls. First, the application can call TerminateTail(null, $\delta$), indicating that a new connection will be established after $\delta$ time. The first parameter is null, as the application does not know about the future connection. Second, the application can call TerminateTail(c, $\infty$), indicating the termination of c and the termination of the current transfer. It can be appreciated that the two calls will trigger at most one T message. The rationale for performing the second call is described in further detail below.

Figure 5:
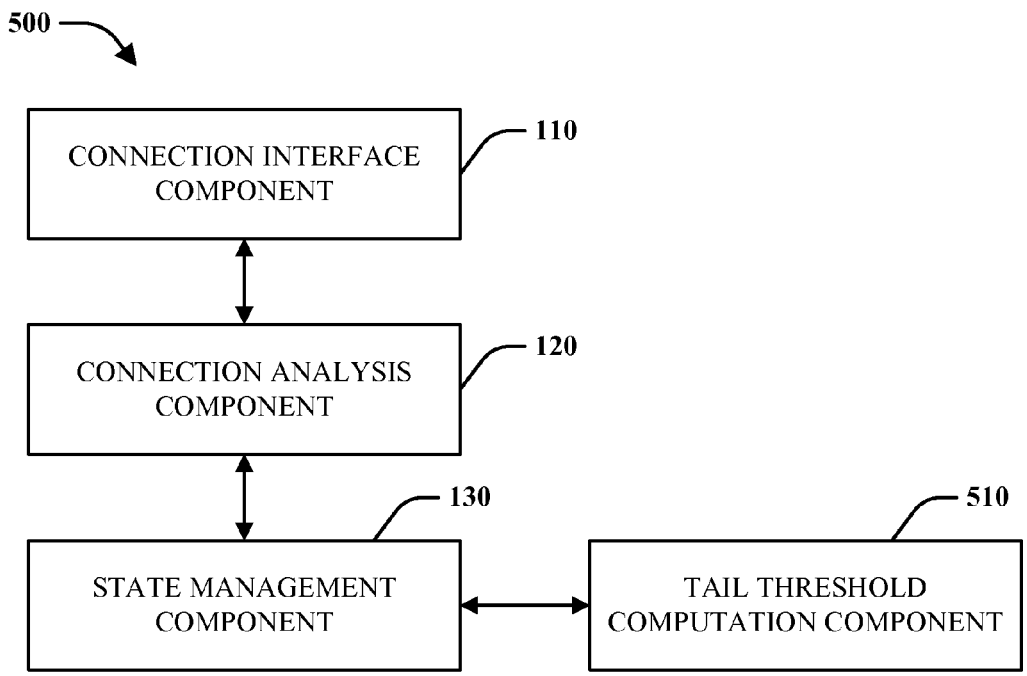
FIG. 5 is a block diagram of a system for computing a threshold time relating to operating state management for a device operable in a wireless communication system in accordance with various aspects.

Turning next to FIG. 5, a system 500 for computing a threshold time relating to operating state management for a device operable in a wireless communication system in accordance with various aspects is illustrated. System 500 can include a connection interface component 110, a connection analysis component 120, and a state management component 130, which can operate in accordance with various aspects described herein. Further, state management component 130 can be associated with a tail threshold computation component 510, which can set and/or otherwise determine the tail threshold value utilized by TOP and/or other suitable mechanisms in various manners.

As defined above, a TT can be used by TOP and/or other suitable state management mechanisms to determine whether to send a T message when TerminateTail is called. When no concurrency exists, TOP can be configured to send a T message if and only if the predicted ITT is greater than the TT. Accordingly, it can be appreciated that a large TT may limit the radio resource and energy savings, while a small TT may incur extra state promotions.

In a typical use scenario, a UE is at DCH when a transfer ends. Assuming this, a T message can be used to trigger a DCH to IDLE demotion. However, in the event of state machine settings such as those illustrated by diagrams 302 and 304 in FIG. 3, a UE will experience two state demotions: DCH to FACH with duration of $\alpha$, and FACH to IDLE with duration of $\beta$. Therefore, the default TT value can be set based on at least one of the DCH to FACH inactivity timer or the FACH to IDLE inactivity timer, e.g., $\alpha+\beta$, to match the original behavior. Thus, by way of example, assuming the predicted ITT is $\delta$, to ensure no additional promotion (if predictions are correct), TOP can be configured to refrain from sending a T message if $\delta<\alpha+\beta=$TT. However, it can be appreciated that such a default value of TT is large (e.g., 17 sec for Carrier 1 as shown in diagram 302 and 10 sec for Carrier 2 as shown in diagram 304), limiting the effectiveness of TOP.

Figure 6:
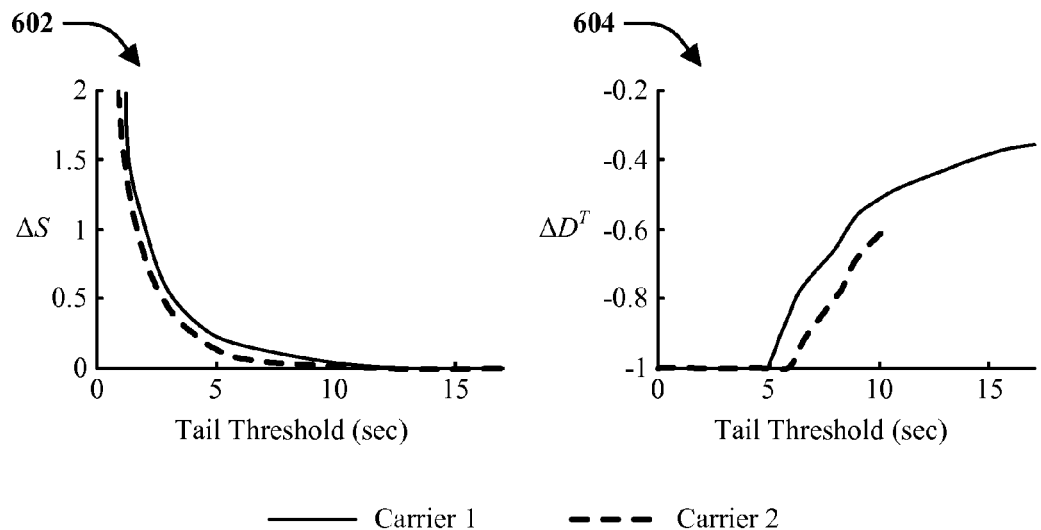
FIG. 6 illustrates example network data that can be considered in connection with various aspects described herein to facilitate optimized network device operation.

In accordance with one aspect, tail threshold computation component 510 can operate based on empirical system measurement based on system traces, such as that shown in diagram 602 in FIG. 6, which can generated as follows. In one example, calibrated sessions can be replayed against respective state machines associated with one or more carriers with different TT values, assuming that a T message is sent whenever the packet inter-arrival time is greater than the TT. The change of the total duration of state promotions $\Delta S$ can then be measured. As shown by diagram 602, ΔS monotonically decreases as TT increases, and reaches zero when TT=α+β. In addition, it can be observed from diagram 602 that reducing TT to the value of α incurs limited promotion overhead, e.g., 22% and 7% for Carrier 1 and Carrier 2, respectively. For the example carriers used, it can be appreciated that given a fixed TT, Carrier 1 has a higher promotion overhead because it has a much longer β timer. On the other hand, as shown by diagram 604 in FIG. 6, which plots the relationship between the TT and the change of the total DCH tail time $\Delta D^T$, setting TT to α+β saves only 35% and 61% of the DCH tail time for the two carriers while reducing TT to α eliminates all DCH tails. Accordingly, TT=α can be utilized to better balance the tradeoffs described above and illustrated by Table II.

Figure 7:
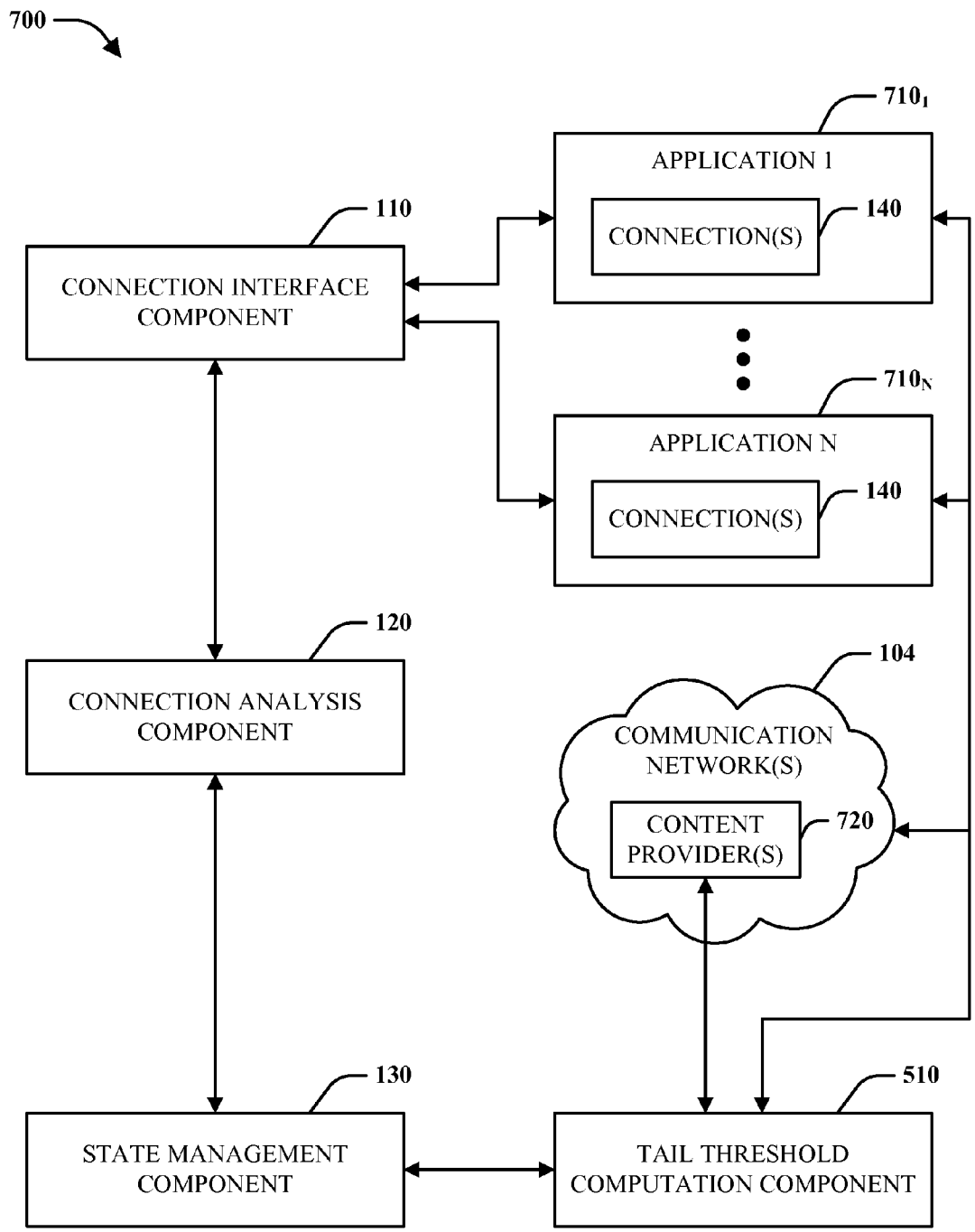
FIG. 7 is a block diagram of a system for identifying a tail threshold associated with a technique for device operating state management in a communication system in accordance with various aspects.

According to another aspect, while tail threshold computation component 510 can set a tail threshold based on empirical system trace information as described above, tail threshold computation component 510 can utilize other factors in addition to, and/or in place of, such information in determining a tail threshold for network device state management. For example, as shown by system 700 in FIG. 7, retrieval of information relating to one or more connections 140 can be facilitated via respective applications 710 utilizing said connections 140, as generally described above. In such an example, tail threshold computation component 510 can set a tail threshold based at least in part on information relating to one or more connections 140 provided by the respective applications 710 (e.g., and obtained via the connection interface component 110). For example, TOP and/or other state management mechanisms utilized by system 700 can be configured such that respective applications 710 can suggest and/or assign tail threshold times for use by state management component 130. Additionally or alternatively, tail threshold computation component 510 can set the tail threshold based at least in part on data obtained from at least one content provider 720 within communication network(s) 104 providing communication services via connection(s) 104. By way of example involving a Web browsing application, a content provider corresponding to a website can embed information relating to a desired tail threshold into a header and/or other elements of the website, such that the Web browsing application can obtain the information upon accessing the website. Upon obtaining such information, the Web browsing application can relay the information to one or more suitable components to facilitate setting of the tail threshold.

Figure 8:
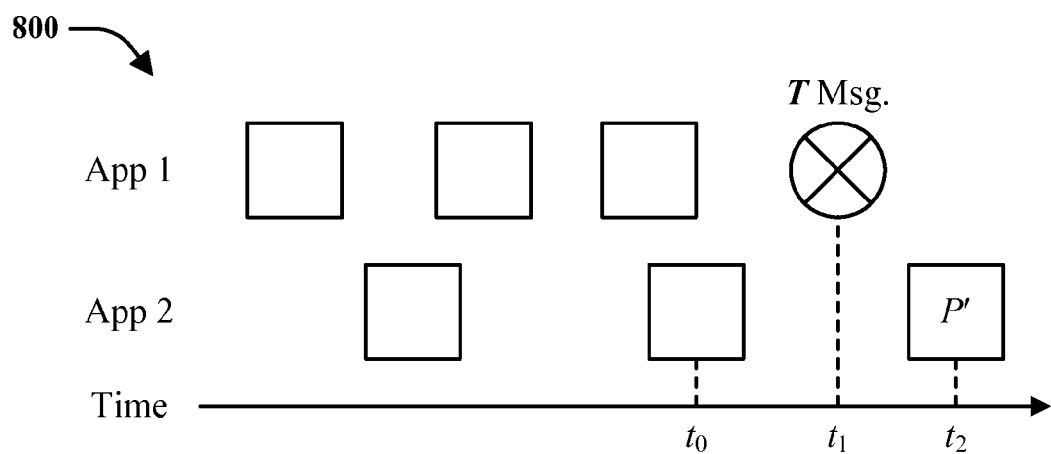
FIG. 8 illustrates an example of concurrent network activity in accordance with various aspects described herein.

In accordance with a further aspect, it can be appreciated that tail elimination can be performed for each data transfer determined by an application 710 and/or its corresponding connections 140. As described above, an application 710 may only ensure that the delay between consecutive transfers is longer than the tail threshold, without considering other applications 710. However, RRC state transitions are determined by the aggregated traffic of all applications 710. Therefore, it can be appreciated that allowing every application 710 and/or connection 140 to send T messages independently causes problems, as illustrated by diagram 800 in FIG. 8. As shown by diagram 800, at time $t_1$, TOP sends a T message for Application 1 to cut its tail. However, P', a packet transmitted by Application 2 at $t_2$, will trigger an unnecessary promotion if $t_2-t_1<TT$.

It can be appreciated that if all connections 140 can precisely predict the packet inter-arrival time, then there exists an optimal algorithm to determine whether to send a T message. The optimal algorithm aggregates prediction across connections by effectively treating all network activity as part of the same connection 140. Accordingly, fast dormancy is triggered only when the combined ITT exceeds the TT. Thus, if $a_1, \ldots, a_n$ represents the predicted arrival time of the next packet for each connection 140 at a given time t, then TOP can send a T packet if $\min\{a_i\}-t>TT$.

In practice, however, it can be appreciated that the above operation of TOP faces various challenges. First, as mentioned above, applications 710 perform the prediction at the transfer level. Therefore, no prediction information is available except for the last packet of a transfer. This may incur additional promotions if, for example, connection $c_1$ invokes fast dormancy when connection $c_2$ is in the middle of a transfer. Second, legacy applications are unaware of TOP, and some applications may not use TOP due to their particular traffic patterns. To handle at least these issues, simple and robust coordination techniques can be implemented as described below.

Figure 9:
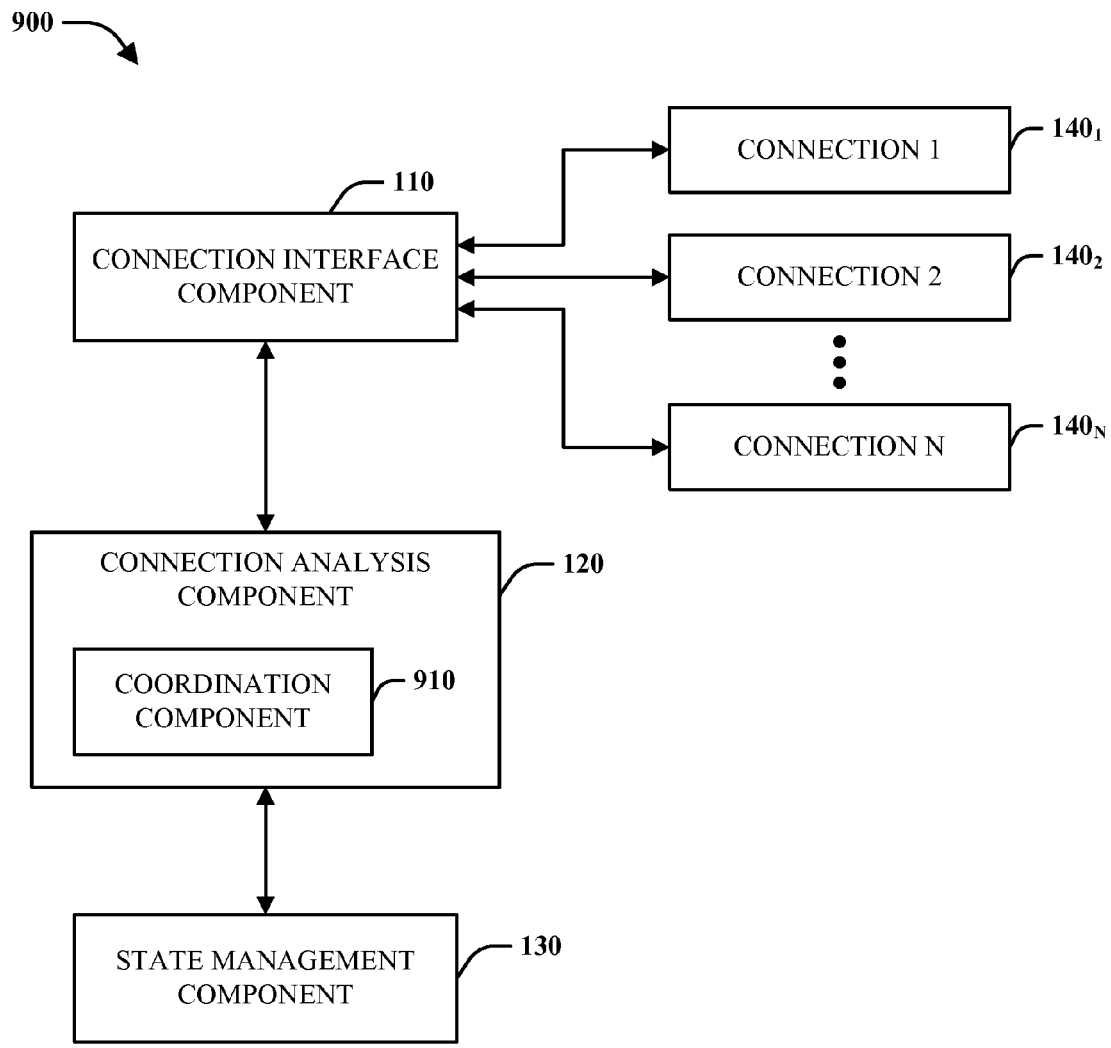
FIGS. 9-10 are block diagrams of respective systems for coordinating between multiple connections to facilitate optimized network device performance in a wireless communication system.

According to an aspect, a TOP algorithm and/or other algorithm can consider two cases to determine whether to send a T message, e.g., for fast dormancy. First, for all connections 140 with ITT prediction information (e.g., TerminateTail is called before the arrival of the next packet), fast dormancy can be triggered only when the combined or aggregated ITT exceeds the tail threshold. This is illustrated by system 900 in FIG. 9. More particularly, as system 900 illustrates, connection interface component 110 can facilitate retrieval of information relating to a plurality of connections 140, based on which connection analysis component 120 can utilize a coordination component 910 and/or other suitable means to estimate the inter-transfer time for connection(s) 140 at least in part by identifying a current timestamp, identifying an earliest predicted data arrival time indicated by connection(s) 140, and computing the inter-transfer time for connection(s) 140 as a time interval measured from the current timestamp to the earliest predicted data arrival time.

Figure 10:
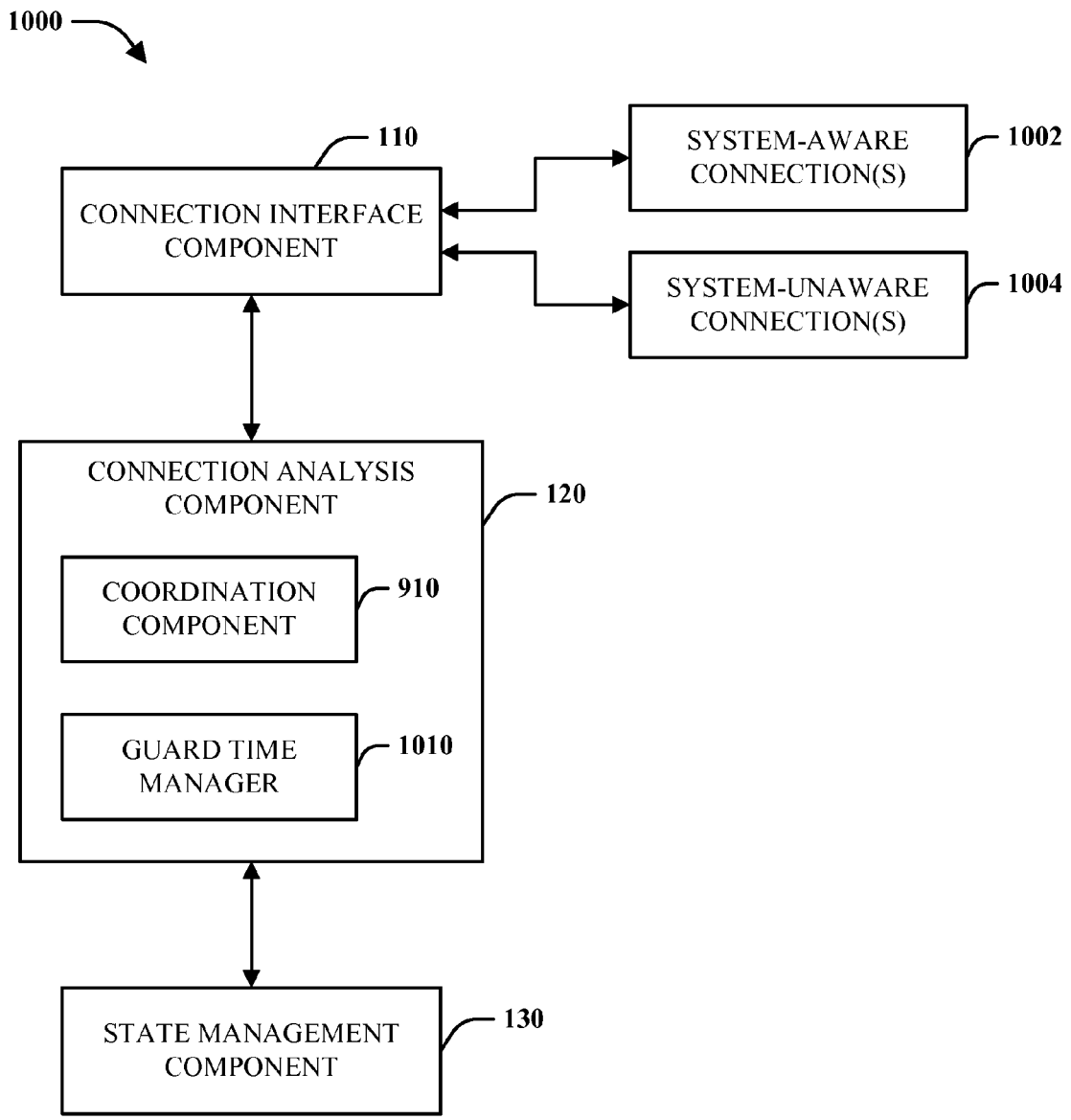

Second, a simple heuristic to can be applied to handle connections without ITT being predicted when TerminateTail is called, because either those connections are not at the end of the transfer or they do not use TOP. This is illustrated, for example, by system 1000 in FIG. 10. As shown by system 1000, if system-unaware connections 1004 exist that do not predict ITT, a T message is not sent (e.g., by state management component) if any of the system-unaware connections 1004 has recent network activity within the past p seconds, where p is a predefined parameter (e.g., 5 s, etc.). Thus, connection interface component 110 can facilitate retrieval of information relating to one or more system-aware connections 1002 that indicate predicted data arrival time and one or more system-unaware connections 1004 that do not indicate predicted data arrival time. Based on such information, connection analysis component 120 can determine an amount of elapsed time following a most recent data arrival over the one or more system-unaware connections 1004 by utilizing a coordination component 910 and/or other suitable means. Subsequently, state management component 130 can initiate a transition to an idle state if the inter-transfer time for the system-aware connections 1002 is substantially greater than a tail threshold and the elapsed time following the most recent data arrival over the system-unaware connection(s) 1004 is substantially greater than a predefined arrival window, which can be defined by a guard time (e.g., p) controlled by a guard time manager 1010 or the like.

It can be appreciated that the above measures can be taken due to the fact that, for an active connection, a recent packet transmission usually indicates another packet transmission in the near future. Not sending a T message at such a case reduces additional promotions. For example, referring back to diagram 800 in FIG. 8 and assuming Application 2 does not use TOP, a T message should not be sent at $t_1$ for Application 1 if $t_1-t_0<p$. In one example, p can be set based on empirical measurement in a similar manner to that described above for tail threshold computation component 510 in FIG. 5.

Returning to FIG. 9, an example coordination algorithm that can be implemented by coordination component 910 and/or other entities in system 900 is described in further detail with reference to the pseudo code listed in Table III below. As shown in Lines 2-3, the algorithm maintains two states for each connection c: ts and predict, which correspond to the timestamp of the last observed packet and the predicted arrival time of the next packet, respectively. The dummy state in Line 4 is explained further below. In one example as shown by Lines 27-30, whenever an incoming or outgoing packet of connection c arrives, c.ts can be updated to $ts_{cur}$, the current timestamp, and c.predict can be set to null, indicating that no prediction information is currently available for connection c. Further, after the last packet is transmitted at the end of a transfer, an application can call TerminateTail(c, δ). Subsequently, as shown by Line 19, TOP can update c.predict to $ts_{cur}+\delta$. TOP can then send a T message as shown by Lines 20-25 if the conditions expressed by Equations (1) and (2) below hold:

$$\min_{c'}\{c'.predict \neq null\} > ts_{cur} + TT \qquad (1)$$

$$\forall\, c' : c'.predict = null \rightarrow c'.ts < ts_{cur} - p \qquad (2)$$

where c goes over all connections and "→" denotes implication. Equations (1) and (2) represent two aforementioned cases where connections are with and without prediction information, respectively. It can be noted that both the tail threshold in Equation (1) (e.g., as used in Line 21) and the p value in Equation (2) (e.g., as used in Line 22) are set to α. However, it should further be appreciated that any suitable values could be utilized for such parameters.

TABLE III

Example TOP coordination algorithm.

```
01  struct CONNECTION { //per-conn. states maintained by TOP
02      TIME STAMP predict;
03      TIME STAMP ts;
04      BOOLEAN dummy; //false for any existing connection
05  }
06  TerminateTail(CONNECTION c, ITT δ) {
07      foreach conn in Connections { //handle out-of-date predictions
08          if (conn.predict < ts_cur) { //ts_cur is the current timestamp
09              if (conn.dummy = true)
10                  {Connections.remove(conn);}
11              else {conn.predict ← null;}
12          }
13      }
14      if (c = null) { //create a dummy connection established soon
15          c ← new CONNECTION;
16          c.dummy ← true;
17          Connections.add(c);
18      }
19      c.predict ← ts_cur + δ; //update the prediction
20      foreach c' in Connections { //check the two constraints
21          if ((c'.predict ≠ null && c'.predict < ts_cur + α)
22              || (c'.predict = null && c'.ts > ts_cur - α))
23              {return;} //fast dormancy is not invoked
24      }
25      send T message;
26  }
27  NewPacketArrival(CONNECTION c) {
28      c.ts = ts_cur;
29      c.predict ← null;
30  }
```

According to an aspect as provided above, for applications that are aware of TOP, TOP can attempt to aggregate the predicted tail times and invoke fast dormancy and/or other suitable procedures only if the aggregated tail time is greater than the tail threshold. Thus, for example, if a first application reports a tail time of 8 seconds and a second application reports a tail time of 5 seconds, the lowest reported tail time, 5 seconds, can be set as the aggregated tail time.

According to another aspect, the OS at a UE and/or other mechanisms suitable for implementing TOP can keep track of respective connections and collect information relating to predicted idle time for substantially all connections. To this end, an interface can be provided by which all applications that are aware of TOP can coordinate to report information to the OS and/or other mechanisms implementing TOP, such that TOP has a global view of substantially all connections and can perform scheduling based on such information. Accordingly, as noted above, TOP can be conducted by obtaining reports from respective applications, aggregating them, and comparing the tail time based on the aggregated reports to a tail threshold.

Referring again to FIG. 9, when the next transfer starts in a new connection, the corresponding application can call TerminateTail(null, δ) then TerminateTail(c, ∞) as described above at the end of connection c, which is also the end of the current transfer. Subsequently, TOP can handle the first call by creating a dummy connection $c_d$ (e.g., as performed in Lines 14-18 above) with $c_d$.predict=$ts_{cur}+\delta$ and adding $c_d$ to consideration according to Equation (1). Subsequently, the dummy connection $c_d$ is removed when its prediction is out-of-date, e.g., $ts_{cur}>c_d$.predict, as performed in Lines 9-10 above. As Line 11 above further provides, the prediction corresponding to an existing connection can be set to null (no prediction information) when the prediction is out-of-date. Further, a prediction can be removed, e.g., not considered by Equation (1) or (2), when the connection is closed by the application.

In accordance with one aspect, an application can in some cases call TerminateTail(null, δ) at $ts_{cur}$, immediately after the last packet of connection c is transmitted. However, it can in some cases be possible that at $ts_{cur}$, c has not yet been removed by TOP, although no packet of c may appear. In this case, c.ts, the timestamp of the last packet of c, can be significantly close to $ts_{cur}$, causing Equation (2) to not hold. Thus, in this case a T message will never be sent. In one example, this can be addressed via a second call TerminateTail(c, ∞) that sets c.predict=∞. By making two calls in this manner, it can be substantially guaranteed that a T message is properly sent even if c is not timely removed.

According to another aspect, it can be appreciated that an application abusing fast dormancy can make a UE send a large amount of T messages, each of which may cause a state demotion to IDLE followed by a promotion triggered by a packet, in a short period. To prevent such a pathological case, TOP can be configured to send at most one T message for every t seconds, even if multiple T messages are allowed by the constraints of Equation (1) and (2). Stated another way, TOP can be configured to elect not to trigger a transition to an idle communicative state if previous triggering to the idle communicative state has occurred within a predetermined time interval. This guarantees that repeatedly calling TerminateTail is harmless, and that the frequency of the additional state promotions caused by TOP is no more than one per t seconds. By way of specific, non-limiting example, t can be set to, e.g., 6-10 seconds in order to have minimal impact on resource savings for normal usage of TOP.

Figure 11:
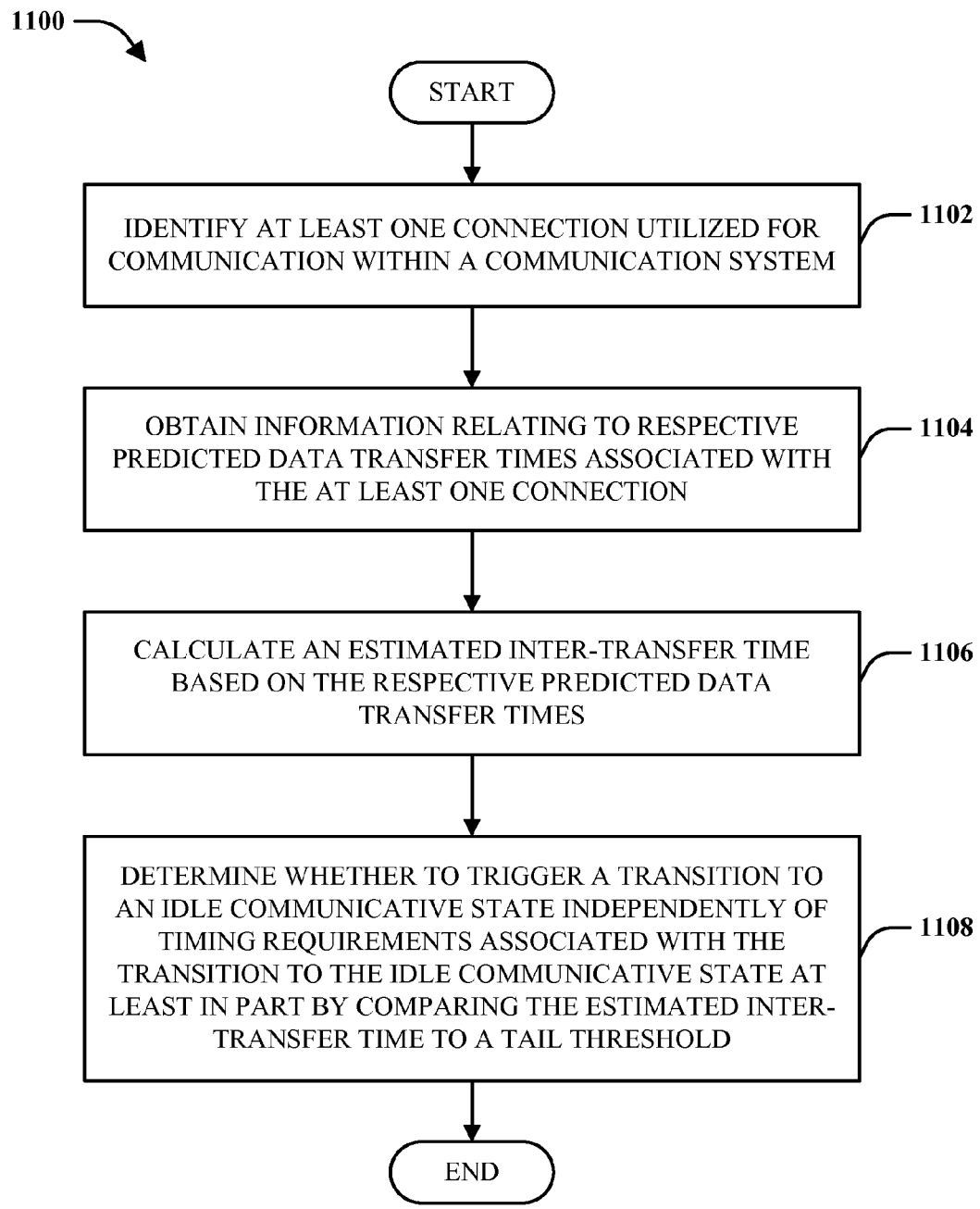
FIGS. 11-13 are flow diagrams of respective methodologies for managing operation of a device within a wireless communication system.
Figure 12:
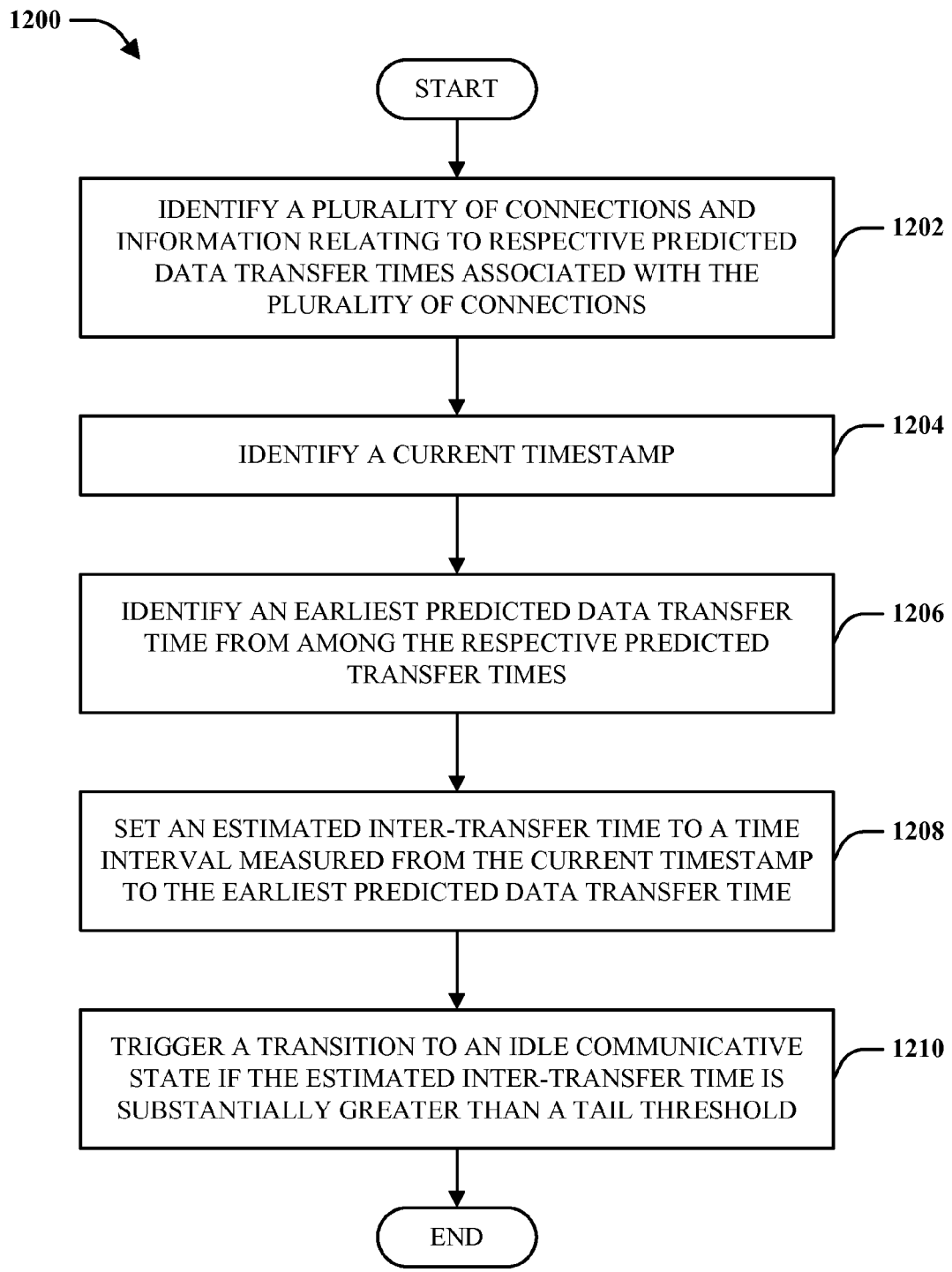
Figure 13:
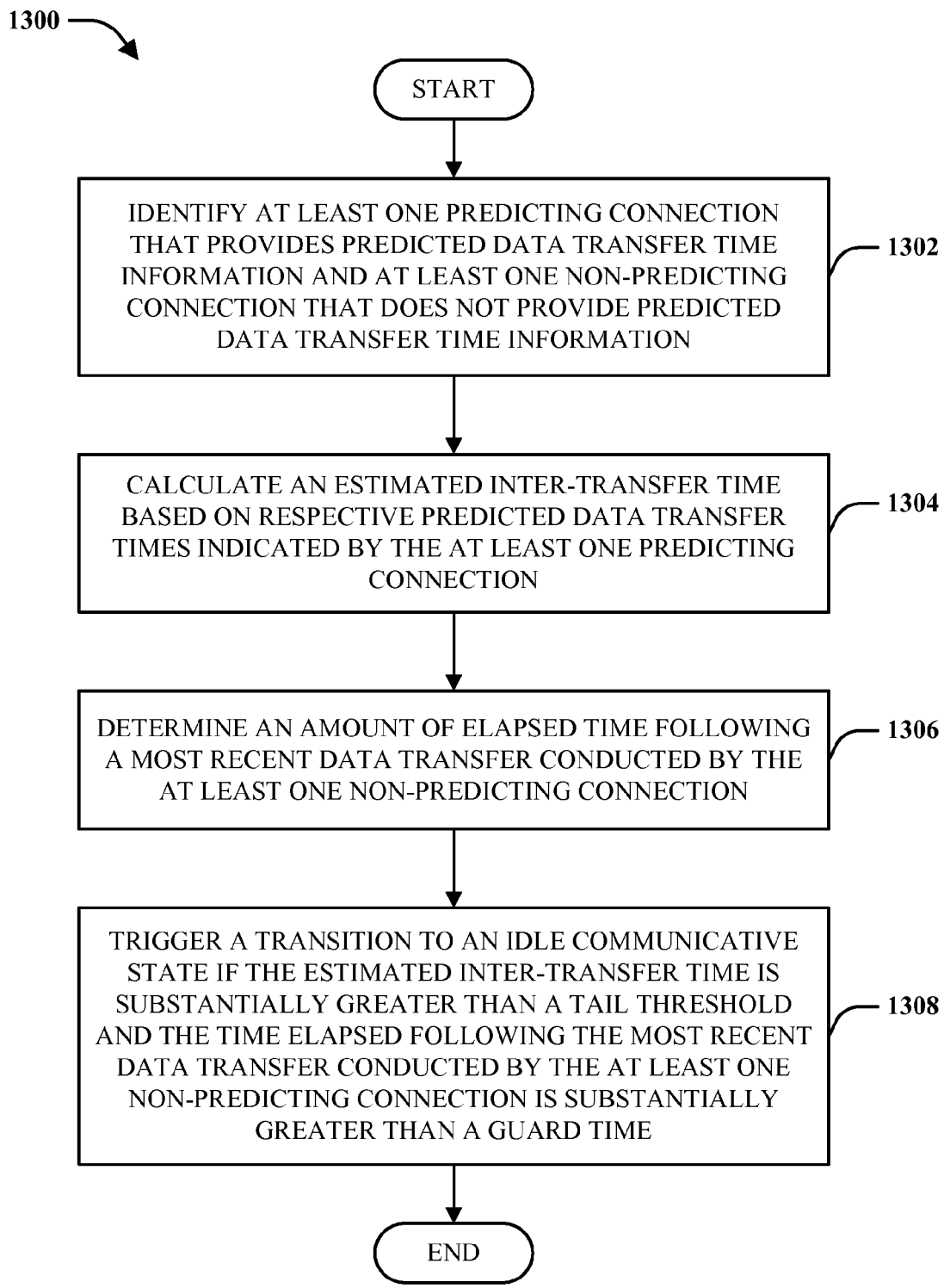

Referring now to FIGS. 11-13, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference first to FIG. 11, a methodology of managing operating states corresponding to a network device (e.g., UE 102) is illustrated. Methodology 1100 can begin at block 1102, wherein at least one connection (e.g., connection(s) 104) utilized for communication within a communication system (e.g., via communication network(s) 104) is identified. At block 1104, information relating to respective predicted data transfer times associated with the at least one connection is obtained (e.g., via a connection interface component 110). At block 1106, an estimated inter-transfer time is calculated (e.g., by a connection analysis component 120) based on the respective predicted data transfer times obtained at block 1104. At block 1108, it is determined (e.g., by a state management component 130) whether to trigger a transition to an idle communicative state independently of timing requirements (e.g., tail time requirements, etc.) associated with the transition to the idle communicative state at least in part by comparing the estimated inter-transfer time calculated at block 1106 to a tail threshold.

Referring next to FIG. 12, a methodology 1200 for coordinating a set of connections in the context of a mobile device tail optimization technique is illustrated. Methodology 1200 can begin at block 1202, wherein a plurality of connections and information relating to respective predicted data transfer times associated with the plurality of connections are identified. At block 1204, a current timestamp is identified. At block 1206, an earliest predicted data transfer time is identified (e.g., by a coordination component 910 associated with, or independent of, a connection analysis component 120) from among the respective predicted transfer times identified at block 1202. At block 1208, an estimated inter-transfer time is set to a time interval measured from the current timestamp identified at block 1204 to the earliest predicted data transfer time identified at block 1206. Methodology 1200 can then conclude at block 1210, wherein a transition to an idle communicative state is triggered if the estimated inter-transfer time obtained at block 1208 is substantially greater than a tail threshold.

Turning to FIG. 13, a methodology 1300 for coordinating optimization-aware applications and legacy applications within a mobile device optimization protocol is illustrated. Methodology 1300 can begin at block 1302, wherein at least one predicting connection (e.g., a system-aware connection 1002 and/or any other connection associated with a prediction-capable application) that provides predicted data transfer time information and at least one non-predicting connection (e.g., a system-unaware connection 1004 and/or any other connection associated with a legacy application or other non-prediction-capable application) that does not provide predicted data transfer time information are identified. At block 1304, an estimated inter-transfer time is calculated based on respective predicted data transfer times indicated by the at least one predicting connection as identified at block 1302. At block 1306, an amount of elapsed time following a most recent data transfer conducted by the at least one non-predicting connection identified at block 1302 is determined (e.g., by a coordination component 910 and/or a guard time manager 1010 associated with, or independent of, a connection analysis component 120). Methodology 1300 can then conclude at block 1308, wherein a transition to an idle communicative state is triggered if the estimated inter-transfer time calculated at block 1304 is substantially greater than a tail threshold and the time elapsed following the most recent data transfer conducted by the at least one non-predicting connection, as determined at block 1306, is substantially greater than a guard time (e.g., as maintained by a guard time manager 1010).

Figure 14:
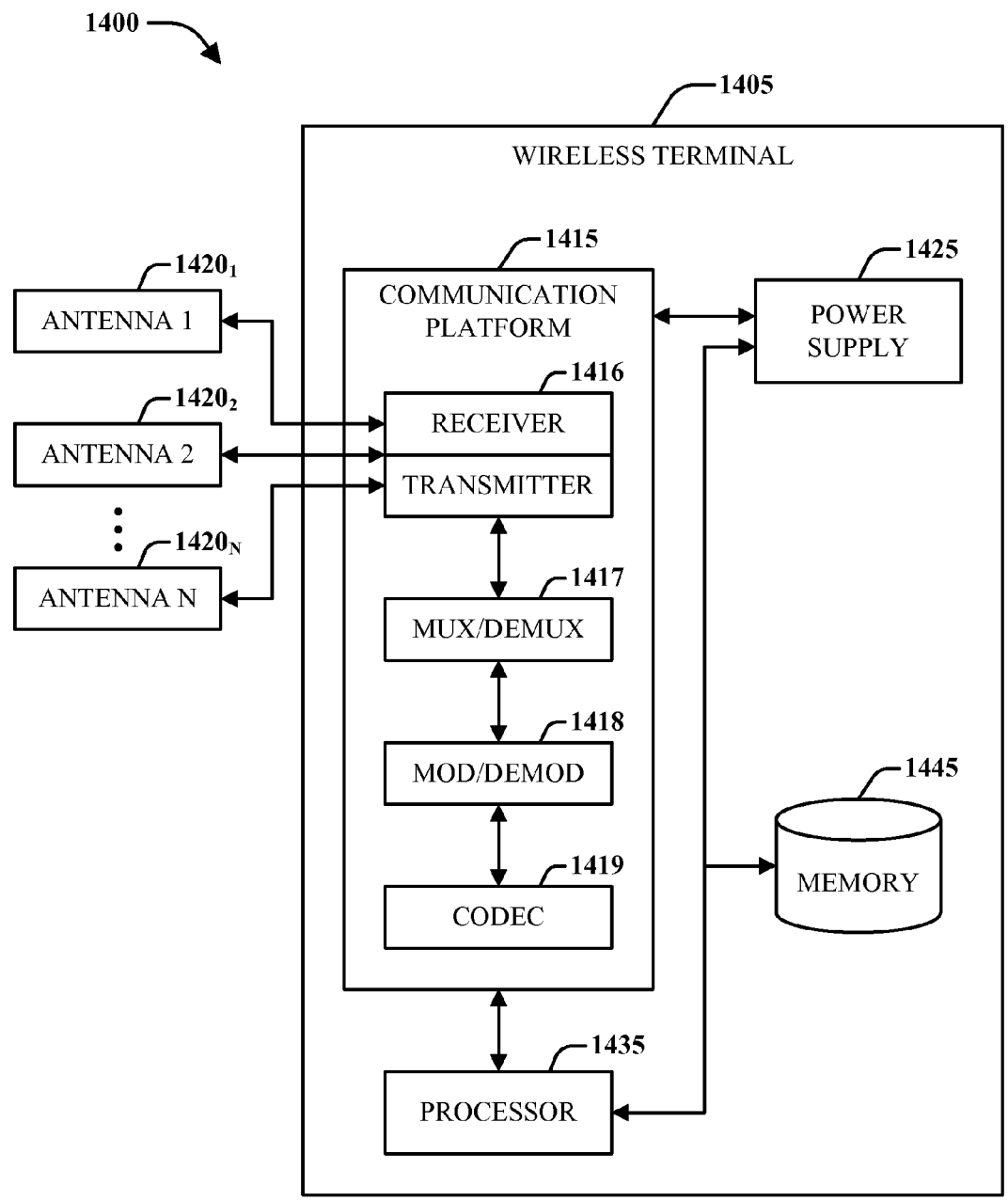
FIG. 14 illustrates an example network device that can be utilized to implement one or more of the various aspects described herein.

In order to provide further context for various aspects of the disclosed subject matter, FIG. 14 illustrates a non-limiting example system 1400 that can implement some or all of the aspects described herein. As FIG. 14 illustrates, system 1400 can include a wireless terminal 1405. In an embodiment, wireless terminal 1405 can receive and transmit signal(s) to and/or from wireless devices such as femto access points, access terminals, wireless ports and routers, or the like, through a set of N antennas 1420. In one example, antennas 1420 can be implemented as part of a communication platform 1415, which in turn can comprise electronic components and associated circuitry and/or other means that provide for processing and manipulation of received signal(s) and signal(s) to be transmitted.

In an aspect, communication platform 1415 can include a receiver/transmitter or transceiver 1416, which can transmit and receive signals and/or perform one or more processing operations on such signals (e.g., conversion from analog to digital upon reception, conversion from digital to analog upon transmission, etc.). In addition, transceiver 1416 can divide a single data stream into multiple, parallel data streams, or perform the reciprocal operation.

In another example, a multiplexer/demultiplexer (mux/demux) unit 1417 can be coupled to transceiver 1416. Mux/demux unit 1417 can, for example, facilitate manipulation of signal in time and frequency space. Additionally or alternatively, mux/demux unit 1417 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 1417 can scramble and spread information according to substantially any code generally known in the art, such as Hadamard-Walsh codes, Baker codes, Kasami codes, polyphase codes, and so on.

In a further example, a modulator/demodulator (mod/demod) unit 1418 implemented within communication platform 1415 can modulate information according to multiple modulation techniques, such as frequency modulation, amplitude modulation (e.g., N-ary quadrature amplitude modulation (N-QAM), etc.), phase-shift keying (PSK), and the like. Further, communication platform 1415 can also include a coder/decoder (codec) module 1419 that facilitates decoding received signal(s) and/or coding signal(s) to convey.

According to another aspect, wireless terminal 1405 can include a processor 1435 configured to confer functionality, at least in part, to substantially any electronic component utilized by wireless terminal 1405. As further shown in system 1400, a power supply 1425 can attach to a power grid and include one or more transformers to achieve a power level at which various components and/or circuitry associated with wireless terminal 1405 can operate. In one example, power supply 1425 can include a rechargeable power mechanism to facilitate continued operation of wireless terminal 1405 in the event that wireless terminal 1405 is disconnected from the power grid, the power grid is not operating, etc.

In a further aspect, processor 1435 can be functionally connected to communication platform 1415 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 1435 can be functionally connected, via a data or system bus, to any other components or circuitry not shown in system 1400 to at least partially confer functionality to each of such components.

As additionally illustrated in system 1400, a memory 1445 can be used by wireless terminal 1405 to store data structures, code instructions and program modules, system or device information, code sequences for scrambling, spreading and pilot transmission, location intelligence storage, determined delay offset(s), over-the-air propagation models, and so on. Processor 1435 can be coupled to the memory 1445 in order to store and retrieve information necessary to operate and/or confer functionality to communication platform 1415 and/or any other components of wireless terminal 1405.

Figure 15:
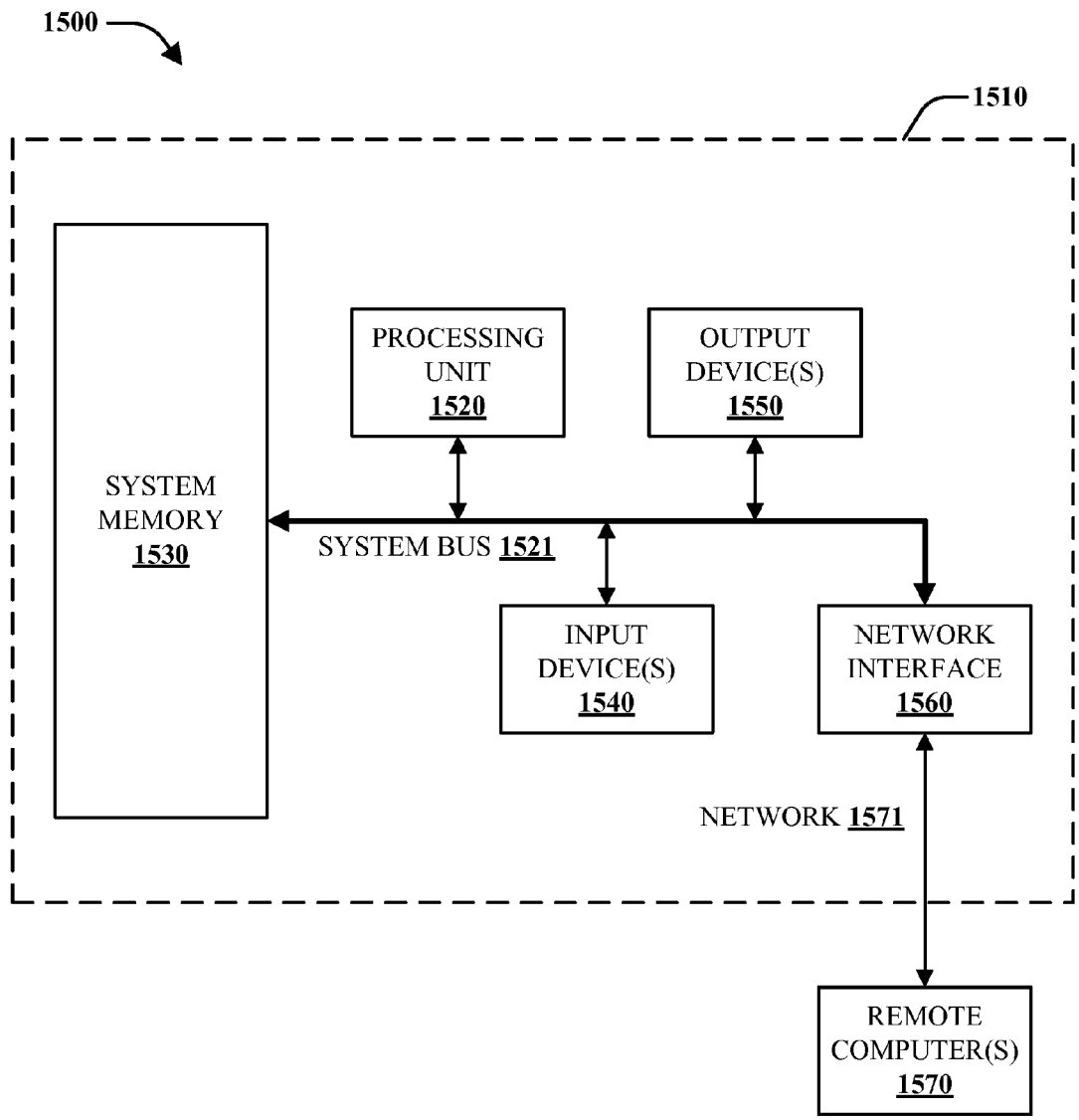
FIG. 15 illustrates an example computing architecture that is operable to execute various aspects described herein.

Turning to FIG. 15, a non-limiting example computing system or operating environment in which various aspects of the disclosed subject matter may be implemented is illustrated. One of ordinary skill in the art can appreciate that handheld, portable and other computing devices and computing objects of all kinds are contemplated for use in connection with the disclosed subject matter, e.g., anywhere that a communications system may be desirably configured. Accordingly, the below general purpose remote computer described below in FIG. 15 is but one example of a computing system in which the disclosed subject matter may be implemented.

Although not required, various aspects of the disclosed subject matter can partly be implemented via an operating system, for use by a developer of services for a device or object, and/or included within application software that operates in connection with the component(s) of the disclosed subject matter. Software may be described in the general context of computer-executable instructions, such as program modules, being executed by one or more computers, such as client workstations, servers or other devices. Those skilled in the art will appreciate that various aspects of the disclosed subject matter may be practiced with other computer system configurations and protocols.

FIG. 15 thus illustrates an example of a suitable computing system environment 1500 in which various aspects of the disclosed subject matter may be implemented, although as made clear above, the computing system environment 1500 is only one example of a suitable computing environment for a media device and is not intended to suggest any limitation as to the scope of use or functionality of the disclosed subject matter. Neither should the computing environment 1500 be interpreted as having any dependency or requirement relating to any one or combination of components illustrated in the example operating environment 1500.

With reference to FIG. 15, an example of a computing environment 1500 for implementing various aspects of the disclosed subject matter includes a general purpose computing device in the form of a computer 1510. Components of computer 1510 can include, but are not limited to, a processing unit 1520, a system memory 1530, and a system bus 1521 that couples various system components including the system memory to the processing unit 1520. The system bus 1521 can be any of several types of bus structures including a memory bus or memory controller, a peripheral bus, and a local bus using any of a variety of bus architectures.

Computer 1510 can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, Electrically Erasable Programmable ROM (EEPROM), flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1530 can include computer storage media in the form of volatile and/or nonvolatile memory such as read only memory (ROM) and/or random access memory (RAM). A basic input/output system (BIOS), containing the basic routines that help to transfer information between elements within computer 1510, such as during start-up, can be stored in memory 1530. Memory 1530 typically also contains data and/or program modules that are immediately accessible to and/or presently being operated on by processing unit 1520. By way of example, and not limitation, memory 1530 can also include an operating system, application programs, other program modules, and program data.

The computer 1510 can also include other removable/non-removable, volatile/nonvolatile computer storage media. For example, computer 1510 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1521 through a non-removable memory interface such as an interface, and a magnetic disk drive or optical disk drive is typically connected to the system bus 1521 by a removable memory interface, such as an interface.

A user can enter commands and information into the computer 1510 through input devices such as a keyboard and pointing device, commonly referred to as a mouse, trackball or touch pad. Other input devices can include a microphone, joystick, game pad, satellite dish, scanner, or the like. These and other input devices are often connected to the processing unit 1520 through user input 1540 and associated interface(s) that are coupled to the system bus 1521, but can be connected by other interface and bus structures, such as a parallel port, game port or a universal serial bus (USB). A graphics subsystem can also be connected to the system bus 1521. A monitor or other type of display device is also connected to the system bus 1521 via an interface, such as output interface 1550, which can in turn communicate with video memory. In addition to a monitor, computers can also include other peripheral output devices such as speakers and a printer, which can be connected through output interface 1550.

The computer 1510 can operate in a networked or distributed environment using logical connections to one or more other remote computers, such as remote computer 1570, which can in turn have media capabilities different from device 1510. The remote computer 1570 can be a personal computer, a server, a router, a network PC, a peer device or other common network node, or any other remote media consumption or transmission device, and can include any or all of the elements described above relative to the computer 1510. The logical connections depicted in FIG. 15 include a network 1571, such local area network (LAN) or a wide area network (WAN), but can also include other networks/buses. Such networking environments are commonplace in homes, offices, enterprise-wide computer networks, intranets and the Internet.

When used in a LAN networking environment, the computer 1510 is connected to the LAN 1571 through a network interface or adapter. When used in a WAN networking environment, the computer 1510 typically includes a communications component, such as a modem, or other means for establishing communications over the WAN, such as the Internet. A communications component, such as a modem, which can be internal or external, can be connected to the system bus 1521 via the user input interface of input 1540, or other appropriate mechanism. In a networked environment, program modules depicted relative to the computer 1510, or portions thereof, can be stored in a remote memory storage device. It will be appreciated that the network connections shown and described are exemplary and other means of establishing a communications link between the computers can be used.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the disclosed subject matter. It is, of course, not possible to describe every conceivable combination of components or methodologies for purposes of describing the disclosed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a system comprising a processor, a time period of a network inactivity timer that is employable to transition a user equipment from a first communicative state to a second communicative state, wherein a first set of radio resources utilized by the user equipment in the first communicative state is greater than a second set of the radio resources utilized by the user equipment in the second communicative state; and
   based on the time period, customizing, by the system, a tail timing criterion that is employable to transition the user equipment from the first communicative state to a third communicative state, wherein a third set of radio resources utilized by the user equipment in the third communicative state is less than the second set of the radio resources utilized by the user equipment in the second communicative state.

2. The method of claim 1, further comprising:
   in response to determining that the tail timing criterion has been satisfied, facilitating, by the system, the transition of the user equipment from the first communicative state to the third communicative state.

3. The method of claim 2, wherein the determining that the tail timing criterion has been satisfied comprises determining that an inter-transfer time period is greater than the time period, wherein the inter-transfer time period represents an estimated delay between data transfers associated with the user equipment and a radio access network device.

4. The method of claim 2, wherein the time period is a first time period and the facilitating the transition comprises facilitating the transition in response to determining that a second time period that represents time elapsed subsequent to the user equipment receiving communication data is greater than a guard time period that is defined based on measurement data received from a radio access network device.

5. The method of claim 1, wherein the customizing comprises customizing the tail timing criterion based on measurement data associated with a set of tail threshold values.

6. The method of claim 5, wherein the customizing comprises customizing the tail timing criterion based on a determined change of a duration of state promotions associated with the set of tail threshold values, wherein the state promotions facilitate a transition of the user equipment from the third communicative state to the first communicative state.

7. The method of claim 6, wherein the customizing comprises customizing the tail timing criterion based on reducing the duration of the state promotions.

8. The method of claim 1, wherein the customizing comprises customizing the tail timing criterion based on information associated with a set of applications of the user equipment.

9. The method of claim 1, wherein the customizing comprises customizing the tail timing criterion based on information received from a content provider device.

10. A system, comprising:
    a processor; and
    a memory that stores executable instructions that, when executed by the processor, facilitate performance of operations, comprising:
       receiving timing data indicative of a time period of a network inactivity timer that is employable to transition a user equipment from a first communicative state to a second communicative state, wherein a first set of radio resources utilized by the user equipment in the first communicative state is greater than a second set of the radio resources utilized by the user equipment in the second communicative state, and
       based on the timing data, determining a tail timing criterion that is employable to transition the user equipment from the first communicative state to a third communicative state, wherein a third set of radio resources utilized by the user equipment in the third communicative state is less than the second set of the radio resources utilized by the user equipment in the second communicative state.

11. The system of claim 10, wherein the determining the tail timing criterion comprises determining the tail timing criterion based on a determined change in a duration of state promotions associated with the set of tail threshold values.

12. The system of claim 11, wherein the state promotions facilitate a transition of the user equipment from the third communicative state to the second communicative state.

13. The system of claim 11, wherein the state promotions facilitate a transition of the user equipment from the third communicative state to the first communicative state.

14. The system of claim 10, wherein the determining the tail timing criterion comprises determining the tail timing criterion based on information associated with a set of applications of the user equipment.

15. The system of claim 10, wherein the determining the tail timing criterion comprises determining the tail timing criterion based on information received from a content provider device.

16. The system of claim 10, wherein the receiving comprises receiving the timing data from a radio network controller device.

17. A non-transitory machine-readable storage medium comprising executable instructions that, in response to execution cause a system comprising a processor to perform operations, comprising:
    based on a time period of a network inactivity timer that is employable to transition a user equipment from a first communicative state to a second communicative state, customizing a tail timing criterion that is employable to transition of the user equipment from the first communicative state to a third communicative state, wherein a first set of radio resources utilized by the user equipment in the first communicative state is greater than a second set of the radio resources utilized by the user equipment in the second communicative state, and a third set of radio resources utilized by the user equipment in the third communicative state is less than the second set of the radio resources utilized by the user equipment in the second communicative state; and
    in response to determining that the tail timing criterion has been satisfied, initiating a transition of the user equipment from the first communicative state to a third communicative state.

18. The non-transitory machine-readable storage medium of claim 17, wherein the determining that the tail timing criterion has been satisfied comprises determining that an inter-transfer time period is greater than the time period, wherein the inter-transfer time period represents an estimated delay between data transfers associated with the user equipment and a radio access network device.

19. The non-transitory machine-readable storage medium of claim 17, wherein the time period is determined based on timing data received from a radio network controller device.

20. The non-transitory machine-readable storage medium of claim 17, wherein the tail timing criterion is determined based on information received from a content provider device.

* * * * *